(12) United States Patent
Shao

(10) Patent No.: US 10,330,476 B2
(45) Date of Patent: Jun. 25, 2019

(54) ANGULAR RATE SENSOR WITH IN-PHASE MOTION SUPPRESSION STRUCTURE

(71) Applicant: NXP USA, Inc., Austin, TX (US)

(72) Inventor: Peng Shao, Chandler, AZ (US)

(73) Assignee: NXP USA, Inc., Austin, TX (US)

( * ) Notice: Subject to any disclaimer, the term of this patent is extended or adjusted under 35 U.S.C. 154(b) by 110 days.

(21) Appl. No.: 15/647,525

(22) Filed: Jul. 12, 2017

(65) Prior Publication Data

US 2019/0017823 A1    Jan. 17, 2019

(51) Int. Cl.
| G01C 19/5747 | (2012.01) |
| G01C 19/5621 | (2012.01) |
| G01C 19/5769 | (2012.01) |
| G01C 19/5733 | (2012.01) |

(52) U.S. Cl.
CPC ..... *G01C 19/5747* (2013.01); *G01C 19/5621* (2013.01); *G01C 19/5733* (2013.01); *G01C 19/5769* (2013.01)

(58) Field of Classification Search
CPC .......................... G01C 19/5747; G01C 19/574
See application file for complete search history.

(56) References Cited

U.S. PATENT DOCUMENTS

| 7,287,428 B2 | 10/2007 | Green |
| 8,322,213 B2 | 12/2012 | Trusov et al. |
| 8,844,357 B2 | 9/2014 | Rolf et al. |
| 9,194,704 B2 | 11/2015 | Lin et al. |
| 9,217,756 B2 | 12/2015 | Simon et al. |
| 9,360,319 B2 | 6/2016 | Jia |
| 2010/0313657 A1 | 12/2010 | Trusov et al. |
| 2012/0247206 A1* | 10/2012 | Ohms ............... G01C 19/5747 73/504.12 |
| 2015/0330783 A1* | 11/2015 | Rocchi .............. G01C 19/5747 73/504.12 |
| 2016/0370182 A1 | 12/2016 | Shao et al. |

* cited by examiner

*Primary Examiner* — John E Chapman, Jr.
(74) *Attorney, Agent, or Firm* — Charlene R. Jacobsen

(57) ABSTRACT

An angular rate sensor includes four Coriolis masses, configured such that the Coriolis masses move along perpendicular drive and sense axes, and a lever mechanism having first and second sets of levers. The first set of levers is coupled outside a boundary of the Coriolis masses, and the second set of levers is coupled within a boundary of the first set of levers and between the Coriolis masses. The second set of levers is configured to produce an anti-phase drive mode motion of the Coriolis masses along the drive axis. The first set of levers is configured to allow an anti-phase sense mode motion of the Coriolis masses along the sense axis responsive to the angular rate sensor rotating around an input axis that is perpendicular to the drive and sense axes. The first and second sets of levers are configured to constrain an in-phase motion of the Coriolis masses.

7 Claims, 12 Drawing Sheets

US 10,330,476 B2

ANGULAR RATE SENSOR WITH IN-PHASE MOTION SUPPRESSION STRUCTURE

TECHNICAL FIELD

The present invention relates generally to sensor devices and more particularly to an angular rate sensor having multiple Coriolis masses and having structure that suppresses in-phase motion of the Coriolis masses.

BACKGROUND

An angular rate sensor, also referred to as a gyroscope, senses angular speed, rate, or velocity, also referred to as angular rate of rotation, around one or more axes. Commonly, angular rate sensors are microelectromechanical systems (MEMS) devices manufactured using MEMS technology, which provides a way to make very small mechanical structures and integrate these structures with electrical devices on a single substrate using conventional batch semiconductor processing techniques. MEMS angular rate sensors are widely used in applications such as automotive, inertial guidance systems, gaming systems, smartphones, cameras, etc. For example, MEMS angular rate sensors are increasingly being adapted for use in the automotive industry to facilitate antiskid control and electronic stability control in anti-rollover systems.

Some MEMS angular rate sensors utilize multiple vibrating structures or masses that are suspended over a substrate and are oftentimes referred to in the art as vibrating structure gyroscopes or Coriolis vibratory gyroscopes. One type of vibrating structure angular rate sensor is a "tuning fork" angular rate sensor having multiple masses, also referred to herein as Coriolis masses. In operation, at least some of the Coriolis masses, acting as drive masses, are driven to resonance in phase opposition, also referred to herein as anti-phase. In response to an external angular stimulus about an input axis, at least some of the Coriolis masses, acting as sense masses, move in phase opposition by exploiting a Coriolis acceleration component, also referred to in the art as the Coriolis effect. Namely, anti-phase movement of the sense masses in response to the Coriolis effect has an amplitude that is proportional to the angular rate of rotation of the angular rate sensor about the input axis.

A drawback of angular rate sensors are their susceptibility to common mode excitation of the Coriolis masses in response to linear and/or angular acceleration due to an external stimulus such as shock, vibration, spurious or parasitic acceleration, etc. Common mode excitation, also referred to herein as in-phase motion, is a condition in which the Coriolis masses, operating as drive masses, sense masses, or both, move in the same direction and at the same amplitude and at a frequency (i.e., the common mode frequency) that is as low as or lower than an operating frequency of the angular rate sensor (i.e., the differential mode frequency). Common mode excitation can lead to inaccuracy or complete failure of the angular rate sensor.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures. The figures are not necessarily drawn to scale.

DETAILED DESCRIPTION

In overview, embodiments described herein are directed to an angular rate sensor that includes structure that mechanically constrains or suppresses in-phase motion of Coriolis masses of the angular rate sensor, for example in response to linear acceleration, angular acceleration, or both. For one embodiment, the angular rate sensor includes first, second, third, and fourth Coriolis masses arranged or configured such that the Coriolis masses are movable along perpendicular drive and sense axes. The angular rate sensor further includes a lever mechanism having first and second sets of levers. The first set of levers is coupled together outside a boundary of the Coriolis masses, and the second set of levers is coupled together within a boundary of the first set of levers and between the Coriolis masses. The second set of levers is configured to produce an anti-phase drive mode motion of the Coriolis masses along the drive axis. The first set of levers is configured to allow an anti-phase sense mode motion of the Coriolis masses along the sense axis responsive to the angular rate sensor rotating around an input axis that is perpendicular to the drive and sense axes. The first and second sets of levers are further configured to constrain an in-phase motion of the Coriolis masses. This configuration of the first and second sets of levers can push resonance modes that are responsible for both linear and angular acceleration to higher frequencies than an operating frequency of the angular rate sensor, thereby effectively suppressing common mode excitation of the angular rate sensor.

Figure 1:
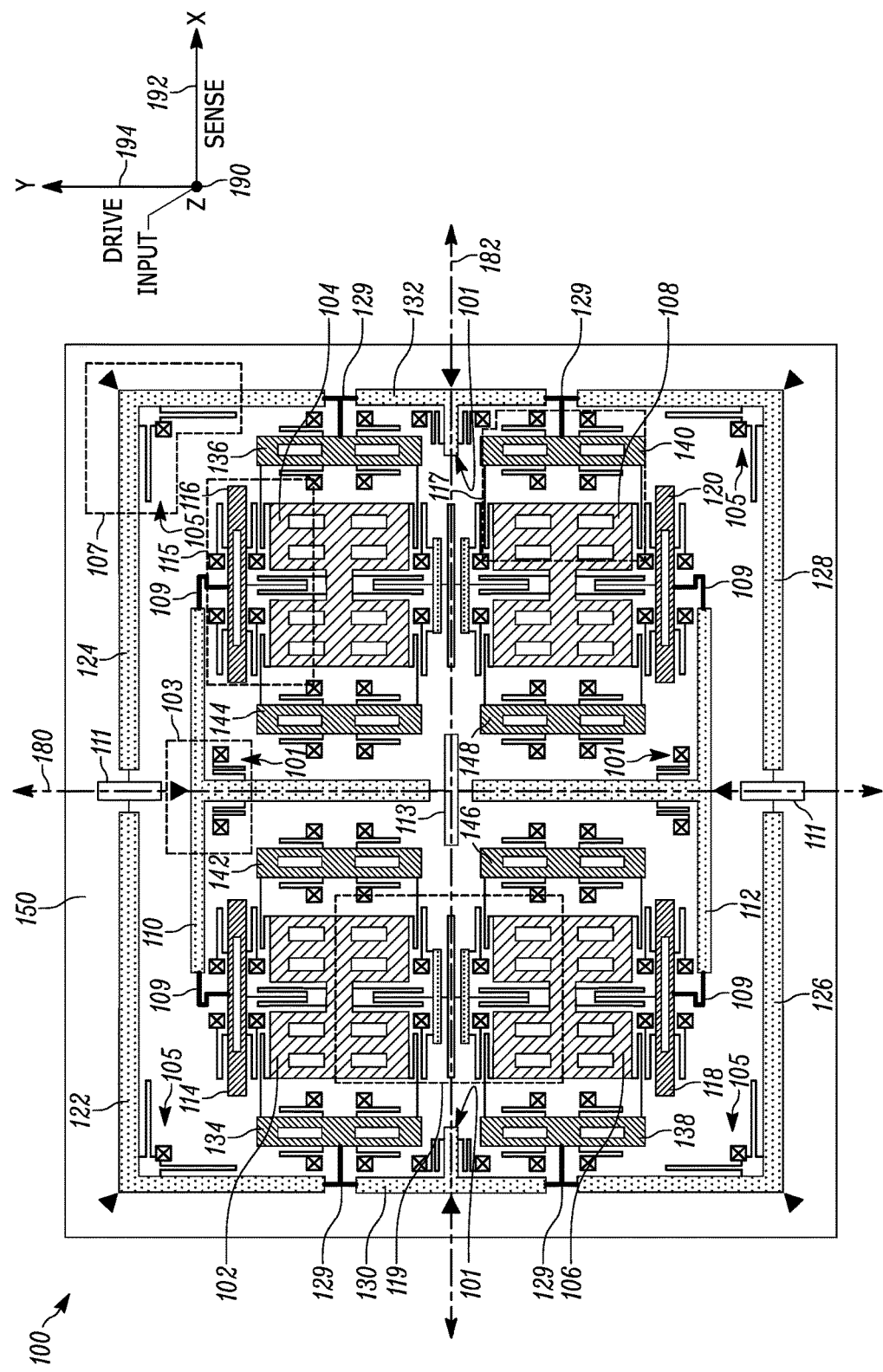
FIG. 1 is a schematic diagram illustrating a top view of a MEMS angular rate sensor in accordance with an embodiment.

FIG. 1 illustrates a top view of an angular rate sensor 100 in accordance with an embodiment. For this embodiment, the angular rate sensor 100 is a MEMS device that can be fabricated using any suitable, e.g., any conventional, silicon MEMS technology. The angular rate sensor 100 is configured to sense angular rate about an axis of rotation referred to as an input axis 190. In the illustrated configuration, input axis 190 is a Z-axis in a three-dimensional coordinate system, where the Z-axis 190 extends out of the page, perpendicular to an X-axis 192 and a Y-axis 194 of the coordinate system. As further illustrated, the X-axis 192 is the sense axis, and Y-axis 194 is the drive axis.

Angular rate sensor 100 includes components of: a planar substrate 150, which is oriented substantially parallel to a plane formed by the X-axis 192 and the Y-axis 194, i.e., the X-Y plane of the angular rate sensor 100; first (102), second (104), third (106), and fourth (108) Coriolis masses that are suspended relative to the planar substrate 150; a lever mechanism having first and second sets of levers (explained later in detail); and a plurality of shuttles 114, 116, 118, 120, 134, 136, 138, 140, 142, 144, 146, and 148. As used herein, first, second, third, and fourth Coriolis masses 102, 104, 106, 108 are components that move in response to a drive mode force or a sense mode force that acts upon the masses 102, 104, 106, 108. Whereas, shuttles 114, 116, 118, 120, 134, 136, 138, 140, 142, 144, 146, and 148 are configured to either generate a drive mode force (i.e., drive mode shuttles) or measure a sense mode force (i.e., sense mode shuttles). These components are coupled together using various mechanical linkages, including various elastic components and anchors, as described in more detail in the language that follows.

As used herein, an elastic component generally refers to a resilient component that can spontaneously resume its original or normal shape after being stretched, compressed, or otherwise distorted and anchors are fixed to a surface of the substrate. Elastic components include, by way of example, linking spring components, flexures, and flexible support elements. Linking spring components link or couple two components of the angular rate sensor 100 together without the linking spring component being coupled to the substrate. Flexures couple to anchors to provide a hinge of rotation for a component of the angular rate sensor 100. Flexible support elements connect various components, of the angular rate sensor 100, to the surface of the substrate via anchors to enable the component to move linearly along a single axis of the X-Y plane of the angular rate sensor 100 while constraining linear movement of the component along the other axis of the X-Y plane.

As further used herein, an anchor is a largely rigid element that is fixed directly to the surface of the substrate. Anchors are illustrated in the figures by boxes with a "X" therein. A lever is a combination of a stiff beam and a hinge configured such that the stiff beam rotates or pivots about an axis, through the hinge, which is perpendicular to the X-Y plane of the angular rate sensor 100. Pivot points for the levers are illustrated in the figures by solid triangles. A stiff beam is a largely rigid element that is suspended above the surface of the substrate and may be coupled to the surface via at least one anchor and one elastic component. In contrast to elastic components, spring constants of stiff beams are configured, set, or tuned to be much stiffer than spring constants of elastic components such that the stiff beams are largely non-compliant, and the elastic components are more compliant than the stiff beams. By way of example, the width of stiff beams may be significantly greater than the width of elastic components, for instance by a ratio greater than 10:1.

In the depicted embodiment, and as described more fully below, Coriolis masses 102, 104, 106, and 108 are configured to undergo in-plane oscillatory linear motion in both a drive direction substantially parallel to the Y- or drive axis 194 and a sense direction substantially parallel to the X- or sense axis 192. Shuttles 114, 116, 118, and 120 (also referred to herein as drive mode shuttles) are configured to undergo in-plane oscillatory linear motion in the drive direction only. Namely, drive mode shuttles 114, 116, 118, and 120 each have a lengthwise dimension arranged substantially parallel to the sense axis 192 and are each elastically coupled to the substrate 150 to allow movement of the drive mode shuttle along the drive axis 194 and constrain movement of the drive mode shuttle along the sense axis 192. For a component having one dimension longer than another dimension, the longer dimension is referred to herein as the lengthwise dimension.

Those skilled in the art will recognize that drive mode shuttles 114, 116, 118, and 120 will have drive comb structures that may be positioned within the central openings for enabling linear motion in the drive direction. Similarly, Coriolis masses 102, 104, 106, and 108 will have sense comb structures that may be positioned within their central openings for detecting sense motion in the sense direction along the sense axis 192. The drive and sense comb structures are not illustrated herein for simplicity.

Shuttles 134, 136, 138, 140, 142, 144, 146, and 148 (also referred to herein as sense mode shuttles) are configured to undergo in-plane oscillatory linear motion in the sense direction only. Namely, sense mode shuttles 134, 136, 138, 140, 142, 144, 146, and 148 each have a lengthwise dimension arranged substantially parallel to the drive axis 194 and are each elastically coupled to the substrate 150 to allow movement of the sense mode shuttle along the sense axis 192 and constrain movement of the sense mode shuttle along the drive axis 194.

As illustrated, the Coriolis masses 102, 104, 106, and 108 are substantially identical and symmetrically oriented relative to each other. Namely, Coriolis masses 102 and 104 are oriented in mirror symmetry about a centerline 180 that is substantially parallel to the Y-axis 194. Coriolis masses 106 and 108 are likewise oriented in mirror symmetry about the centerline 180. Moreover, Coriolis masses 102 and 106 are oriented in mirror symmetry about a centerline 182 that is substantially parallel to the X-axis 192. Coriolis masses 104 and 108 are likewise oriented in mirror symmetry about the centerline 182.

This relative orientation of the Coriolis masses creates an outside boundary of the Coriolis masses that is substantially in the shape of a quadrangle, in this case the shape of a square. This outside boundary is formed by first and third perpendicular sides of the Coriolis mass 102 that are adjacent to (with the exception of mechanical linkages coupled therebetwen) and substantially parallel to sides of shuttles 114 and 134 respectively, first and third perpendicular sides of the Coriolis mass 104 that are adjacent and substantially parallel to sides of shuttles 116 and 136 respectively, first and third perpendicular sides of the Coriolis mass 106 that are adjacent and substantially parallel to sides of shuttles 118 and 138 respectively, and first and third perpendicular sides of the Coriolis mass 108 that are adjacent and substantially parallel to sides of shuttles 120 and 140 respectively. The first sides of the Coriolis masses are substantially parallel to the sense axis 192, and the third sides of the Coriolis masses are substantially parallel to the drive axis 194.

The first set of levers of the lever mechanism, of the angular rate sensor 100, includes stiff beams 122, 124, 126, 128, 130, and 132, which are coupled together outside the boundary of the Coriolis masses 102, 104, 106, 108. The second set of levers includes stiff beams 110 and 112, which are coupled together within a boundary of, or formed by, the stiff beams 122, 124, 126, 128, 130, and 132. Stiff beams 110 and 112 are also coupled together between the Coriolis masses 102, 104, 106, and 108 as shown and as later described.

Stiff beams 122, 124, 126, and 128, of the first set of levers of the angular rate sensor 100, are substantially identical and symmetrically oriented relative to each other, and first and second additional stiff beams 130 and 132 are substantially identical and symmetrically oriented relative to each other. In the illustrated embodiment, stiff beams 122, 124, 126, and 128 are L-shaped stiff beams, and stiff beams 130 and 132 are T-shaped stiff beams, which are all arranged around the boundary of the Coriolis masses 102, 104, 106, and 108. This relative orientation of the stiff beams 122, 124, 126, 128, 130, and 132 creates a boundary (outside the boundary of the Coriolis masses 102 104, 106, and 108) that is substantially in the shape of a quadrangle.

In general, L-shaped stiff beams 122 and 124 are oriented in mirror symmetry about the centerline 180, and L-shaped stiff beams 126 and 128 are oriented in mirror symmetry about the centerline 180. T-shaped stiff beams 130 and 132 are likewise oriented in mirror symmetry about the centerline 180 and are centered about the centerline 182. Moreover, L-shaped stiff beams 122 and 126 are oriented in mirror symmetry about the centerline 182. L-shaped stiff beams 124 and 128 are likewise oriented in mirror symmetry about the centerline 182.

In the particular embodiment illustrated, the L-shaped stiff beams 122, 124, 126, and 128 have perpendicularly intersecting first and second legs. The point of intersection of the first and second legs is at one end of each leg, while the other end of each leg is coupled via a linking spring component to another stiff beam of the first set of stiff beams. For each L-shaped stiff beam, the second leg is shorter than the first leg, but both legs may have similar widths. The T-shaped stiff beams 130 and 132 also have perpendicularly intersecting first and second legs, but the point of intersection between the first and second legs is a central location or region of the first leg. Also, the second leg of each T-shaped stiff beam 130 and 132 has smaller dimensions than the first leg.

As shown, the first legs of the L-shaped stiff beams 122, 124, 126, and 128 are positioned parallel to the sense axis 192, and the second perpendicularly intersecting legs of the L-shaped stiff beams 122, 124, 126, and 128 are positioned parallel to the drive axis 194. Ends of the first legs of different pairs of the L-shaped stiff beams 122, 124, 126, and 128 are coupled together. Namely, ends of the first legs of the L-shaped stiff beams 122 and 124 are coupled together using a linking spring component 111, and ends of the first legs of the L-shaped stiff beams 126 and 128 are coupled together using another linking spring component 111.

Linking spring components 111 are suspended relative to the substrate 150 and each has a lengthwise dimension arranged substantially parallel to the drive axis 194. Moreover, one of the linking spring components 111 has a central region of one side connected to an end of the first leg of the L-shaped stiff beam 122 and a central region of another side connected to an end of the first leg of the L-shaped stiff beam 124. Similarly, the other of the linking spring components 111 has a central region of one side connected to an end of the first leg of the L-shaped stiff beam 126 and a central region of another side connected to an end of the first leg of the L-shaped stiff beam 128.

The first leg of each of the additional T-shaped stiff beams 130 and 132 is coupled lengthwise between the second legs of different pairs of the L-shaped stiff beams 122, 124, 126, and 128 using linking spring components 129. Namely, linking spring component 129 is a T-shaped linking spring component having three ends, wherein one end connects to an end of the second leg of an L-shaped still beam 122, 124, 126, or 128. Another end connects to an end of the first leg of a T-shaped stiff beam 130 or 132, and the third end connects to one of the sense mode shuttles 134, 136, 138, 140.

The first set of levers further includes a set of six hinges. Each of the L-shaped stiff beams 122, 124, 126, and 128 is coupled to and suspended above the substrate 150 using a hinge 105. The L-shaped stiff beams 122, 124, 126, and 128 are configured to rotate about hinges 105 at intersections of the first and second legs of the L-shaped stiff beams 122, 124, 126, and 128. Each of the T-shaped stiff beams 130 and 132 is coupled to and suspended above the substrate 150 using a hinge 101. The T-shaped stiff beams 130 and 132 are configured to rotate about hinges 101 at intersections of the first and second legs of the T-shaped stiff beams 130 and 132. The details of hinge 101 will be described below in connection with FIG. 2. Further, the details of hinge 105 will be described below in connection with FIG. 3.

Now regarding the second set of levers which includes stiff beams 110 and 112, stiff beams 110 and 112 are substantially identical and symmetrically oriented relative to each other. In the illustrated embodiment, stiff beams 110 and 112 are diametrically positioned first and second T-shaped stiff beams, which are oriented in mirror symmetry about the centerline 182. As shown, T-shaped stiff beams 110 and 112 each have a first leg and a perpendicularly intersecting second leg, with ends of the second legs being coupled together using an elastic component 113. In the embodiment shown, the first and second legs of each of the T-shaped stiff beams 110 and 112 have substantially the same dimensions, and the point of intersection between the first and second legs is a central location or region of the first leg. For an embodiment, the elastic component 113 is a linking spring component that is suspended relative to the substrate 150 and has a lengthwise dimension arranged substantially parallel to the sense axis 192. The linking spring component 113 has a central region of one side connected to the second leg of the T-shaped stiff beam 110 and a central region of another side connected to the second leg of the T-shaped stiff beam 112, to couple or link the second legs of the T-shaped stiff beams 110 and 112.

The second set of levers also includes a set of two hinges 101, wherein each of the T-shaped stiff beams 110 and 112 is coupled to and suspended above the substrate 150 using a hinge 101. The T-shaped stiff beams 110 and 112 are configured to rotate about the two hinges 101 at the intersections of the first and second legs of the T-shaped stiff beams 110 and 112.

Figure 2:
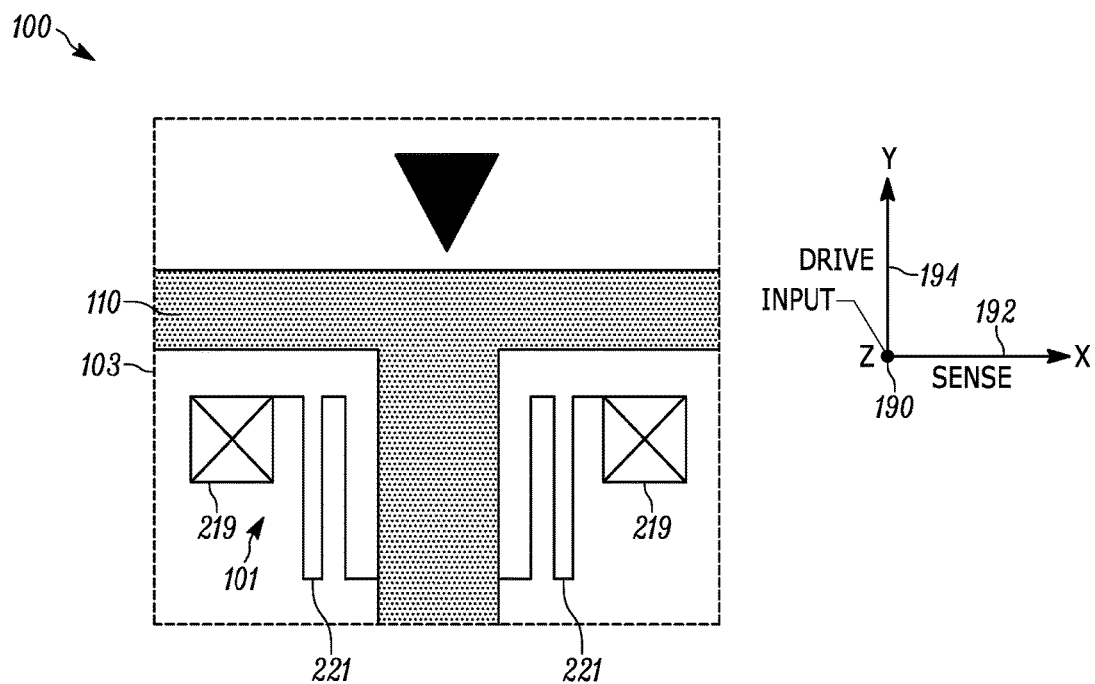
FIG. 2 shows a top view of an enlarged portion of the MEMS angular rate sensor of FIG. 1, illustrating a type of hinge.

Referring concurrently to FIGS. 1 and 2, FIG. 2 shows an enlarged partial top view of the angular rate sensor 100, which is demarcated in FIG. 1 by a dashed line box 103, illustrating one of the hinges 101 coupled to T-shaped stiff beam 110. Although hinge 101 is described in connection with T-shaped stiff beam 110, it should be understood that the following discussion applies equivalently to hinge 101 coupled to T-shaped stiff beam 112. Further, the following discussion applies equivalently to hinges 101 coupled respectively to T-shaped stiff beams 130 and 132. Each hinge 101 includes two anchors 219 and two flexures 221. As illustrated in FIG. 2, one of the anchors 219 is positioned on each of opposing sides of the second leg of the T-shaped stiff beam 110 and positioned near the first leg of the T-shaped stiff beam. One of the flexures 221 is positioned on each of the opposing sides of the second leg of the T-shaped stiff beam 110, with each flexure 221 having a lengthwise dimension arranged substantially parallel to the second leg of the T-shaped stiff beam 110. Each flexure 221 connects a side of the second leg of the T-shaped stiff beam 110 to the anchor 219 positioned on the same side of the second leg.

During operation of the angular rate sensor 100, each of the T-shaped stiff beams 110, 112, 130, and 132 pivots on its respective hinge 101 at the pivot point shown to allow angular displacement in the form of rotational movement of the T-shaped stiff beam with respect to the hinge 101. Namely, each of the flexures 221 is rotationally compliant about the Z-axis 190 to allow for rotation about the Z-axis 190. However, the flexures 221 are axially stiff to prevent linear movement of the flexures 221 parallel to Z-axis 190 so that the rotational movement of the flexures 221, and thereby the rotational movement of T-shaped stiff beam, is constrained to the X-Y plane of the angular rate sensor 100.

Figure 3:
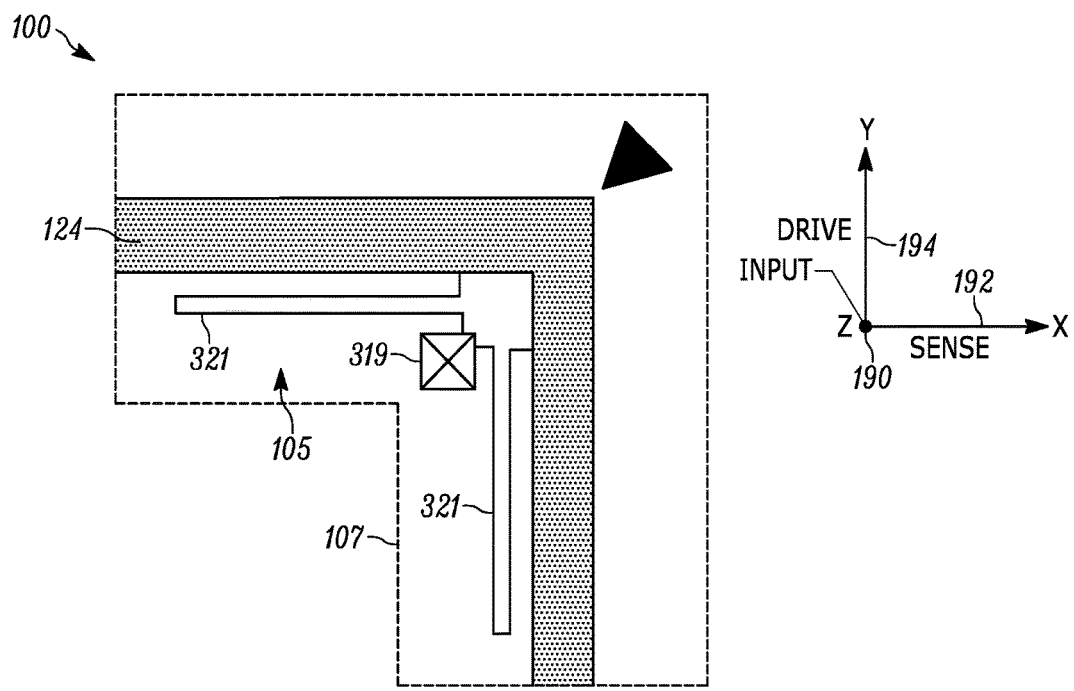
FIG. 3 shows a top view of an enlarged portion of the MEMS angular rate sensor of FIG. 1, illustrating another type of hinge.

Now referring concurrently to FIGS. 1 and 3, FIG. 3 shows an enlarged partial top view of the angular rate sensor 100, which is demarcated in FIG. 1 by a dashed line box 107, illustrating one of the hinges 105 coupled to the L-shaped stiff beam 124. Although the hinge 105 is described in connection with the L-shaped stiff beam 124, it should be understood that the following discussion applies equivalently to the hinges 105 coupled respectively to the L-shaped stiff beams 122, 126, and 128. Each hinge 105 includes an anchor 319 and two flexures 321. The anchor 319 is positioned between the intersection point of the first and second legs of the L-shaped stiff beam 124 such that a first corner of the anchor 319 is near the intersection point. One of the flexures 321 has a lengthwise dimension arranged substantially parallel to the sense axis 192. This flexure 321 connects a side of the first leg of the L-shaped stiff beam 124, near the intersection point, to the first corner of the anchor 319. The other flexure 321 has a lengthwise dimension arranged substantially parallel to the drive axis 194. This flexure 321 connects a side of the second leg of the L-shaped stiff beam 124, near the intersection point, to the first corner of the anchor 319.

During operation of the angular rate sensor 100, each of the L-shaped stiff beams 122, 124, 126, 128 if configured to pivot on its respective hinge 105 at the pivot point shown to allow angular displacement in the form of rotational movement of the L-shaped stiff beam with respect to its hinge 105. Namely, each of the flexures 321 is rotationally compliant about the Z-axis 190 to allow for rotation about the Z-axis 190. However, the flexures 321 are axially stiff to prevent linear movement of the flexures 321 parallel to Z-axis 190 so that the rotational movement of the flexures 321, and thereby the rotational movement of the L-shaped stiff beam, is constrained to the X-Y plane of the angular rate sensor 100.

With reference back to FIG. 1, the first leg of the first T-shaped stiff beam 110 is coupled lengthwise to the first sides of the first and second Coriolis masses 102 and 104, which are substantially parallel to the sense axis 192. More particularly, first and second drive mode shuttles 114 and 116 respectively couple opposing ends of the first leg of the first T-shaped stiff beam 110 to the first sides of the first and second Coriolis masses 102 and 104. Accordingly, the second leg of the first T-shaped second stiff 110 beam extends between the first and second drive mode shuttles 114 and 116 and between second sides of the first and second Coriolis masses 102 and 104. The second sides of the first and second Coriolis masses 102 and 104 are substantially parallel to the drive axis 194.

In the embodiment illustrated, a first end of the first leg of the T-shaped stiff beam 110 is coupled to the drive mode shuttle 114 using a linking spring component 109, and an opposing second end of the first leg of the T-shaped stiff beam 110 is coupled to the drive mode shuttle 116 using another linking spring component 109. That is, one end of a linking spring component 109 is connected to the first end of the first leg of the T-shaped stiff beam 110, and the other end of the linking spring component 109 is connected to a central point of a first side of the drive mode shuttle 114. Furthermore, one end of a similar linking spring component 109 is connected to the second end of the first leg of the T-shaped stiff beam 110, and the other end of the linking spring component 109 is connected to a central point of a first side of the drive mode shuttle 116. For an embodiment, each linking spring component 109 described herein is suspended relative to the substrate 150 and has a lengthwise dimension arranged substantially parallel to the drive axis 194.

Similarly shown in FIG. 1, the first leg of the second T-shaped stiff beam 112 is coupled lengthwise to the first sides of the third and fourth Coriolis masses 106 and 108, which are substantially parallel to the sense axis 192. More particularly, third and fourth drive mode shuttles 118 and 120 respectively couple opposing ends of the first leg of the second T-shaped stiff beam 112 to the first sides of the third and fourth Coriolis masses 106 and 108. Accordingly, the second leg of the second T-shaped second stiff 112 beam extends between the third and fourth drive mode shuttles 118 and 120 and between second sides of the third and fourth Coriolis masses 106 and 108. The second sides of the third and fourth Coriolis masses 106 and 18 are substantially parallel to the drive axis 194.

In the embodiment illustrated, a first end of the first leg of the T-shaped stiff beam 112 is coupled to the drive mode shuttle 118 using a linking spring component 109, and an opposing second end of the first leg of the T-shaped stiff beam 112 is coupled to the drive mode shuttle 120 using another linking spring component 109. That is, one end of a linking spring component 109 is connected to the first end of the first leg of the T-shaped stiff beam 112, and the other end of the linking spring component 109 is connected to a central point of a first side of the drive mode shuttle 118. Furthermore, one end of a similar linking spring component 109 is connected to the second end of the first leg of the T-shaped stiff beam 112, and the other end of the linking spring component 109 is connected to a central point of a first side of the drive mode shuttle 120.

The drive mode shuttles 114 and 116 are each suspended relative to the substrate 150 and coupled to the respective Coriolis masses 102 and 104 using an elastic component and anchor system as described by reference to FIG. 4. Likewise, the drive mode shuttles 118 and 120 are each suspended relative to the substrate 150 and coupled to the respective Coriolis masses 106 and 108 using an elastic component and anchor system as described by reference to FIG. 4.

Figure 4:
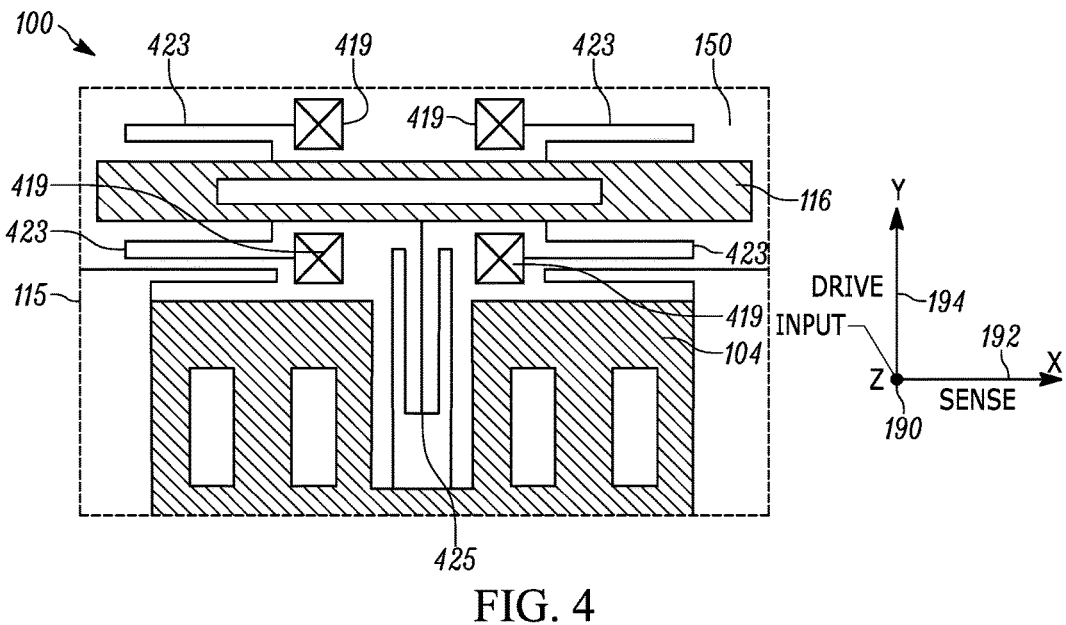
FIG. 4 shows a top view of an enlarged portion of the MEMS angular rate sensor of FIG. 1, illustrating an elastic component and anchor system used to couple a drive mode shuttle to a substrate and to a Coriolis mass.

Referring concurrently to FIGS. 1 and 4, FIG. 4 shows an enlarged partial top view of the angular rate sensor 100, which is demarcated in FIG. 1 by a dashed line box 115, illustrating an elastic component and anchor system used to couple the drive mode shuttle 116 to the substrate 150 and to the Coriolis mass 104. FIG. 4 shows the elastic component and anchor system associated with drive mode shuttle 116 and Coriolis mass 104. It should be understood, however, that the following discussion applies equivalently to the elastic component and anchor system associated with drive mode shuttle 114 and Coriolis mass 102, the elastic component and anchor system associated with drive mode shuttle 118 and Coriolis mass 106, and the elastic component and anchor system associated with drive mode shuttle 120 and Coriolis mass 108.

As illustrated in FIG. 4, the elastic component and anchor system includes four anchors 419, four flexible support elements 423, and a linking spring component 425. The anchors 419 and flexible support elements 423 couple the drive mode shuttle 116 to the substrate 150 and suspend the drive mode shuttle 116 relative to the substrate 150. Namely, two of the anchors 419 are connected to the surface of substrate 150 near a central region of the first side of the drive mode shuttle 116. The other two anchors 419 are connected to the surface of the substrate 150 near a central region of a second side of the drive mode shuttle 116 and near the central region of the first side of the Coriolis mass 104.

Each flexible support element 423 has a lengthwise dimension arranged adjacent to and substantially parallel to the first or the second side of the drive mode shuttle 116. Moreover, each flexible support element 423 connects the side of the drive mode shuttle 116, to which it is adjacent, to the closest anchor 419 on that side. The linking spring component 425 connects the drive mode shuttle 116 to the Coriolis mass 104. Namely, the linking spring component 425 has a lengthwise dimension arranged substantially parallel to the drive axis 194, with a first end connected to a central region of the second side of the drive mode shuttle 116 and second ends connected to a central region of the Coriolis mass 104. In general, the flexible support elements 423 restrict movement of the drive mode shuttle 116 to the drive axis 194, and the linking spring component 425 enables movement of the Coriolis mass 104 along the drive axis 194 substantially concurrently as the drive mode shuttle 116 moves.

Figure 5:
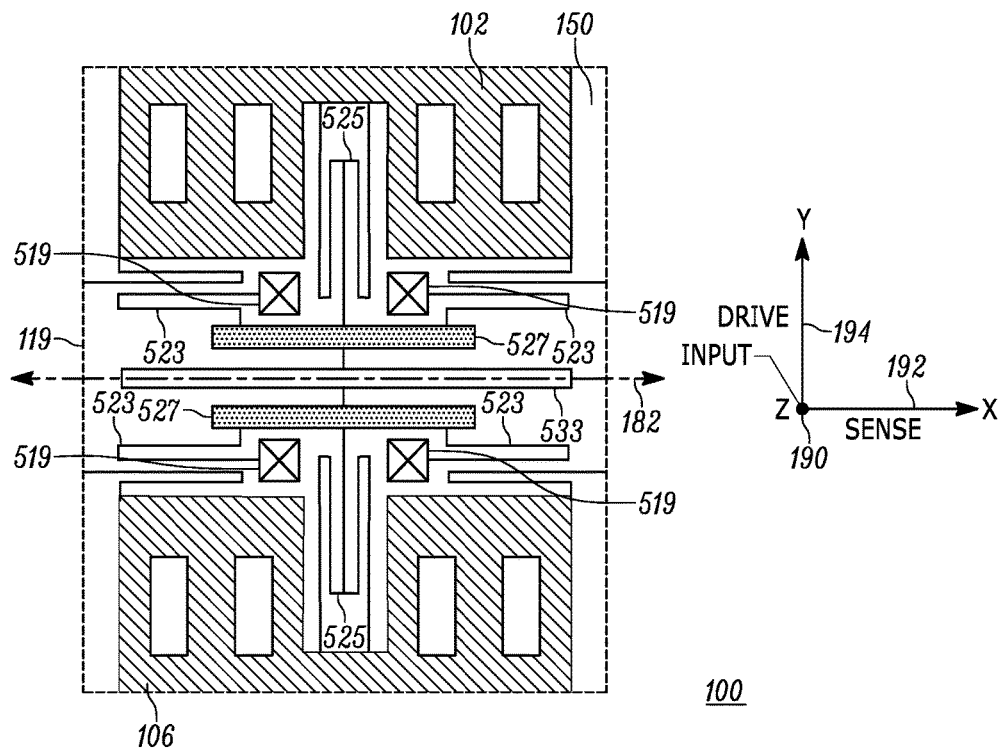
FIG. 5 shows a top view of an enlarged portion of the MEMS angular rate sensor of FIG. 1, illustrating an elastic component and anchor system used to couple two Coriolis masses together and to the substrate.

Referring now to FIGS. 1 and 5, FIG. 5 shows an enlarged partial top view of the angular rate sensor 100, which is demarcated in FIG. 1 by a dashed line box 119, illustrating an elastic component and anchor system coupling together fourth sides of the Coriolis masses 102 and 106, wherein the fourth sides are substantially parallel to the sense axis 192. Although the elastic component and anchor system is described in connection with Coriolis masses 102 and 106, it should be understood that the following discussion applies equivalently to the elastic component and anchor system coupling together fourth sides of Coriolis masses 104 and 108, wherein the fourth sides are substantially parallel to the sense axis 192.

As shown in FIG. 5, the elastic component and anchor system includes four anchors 519, four flexible support elements 523, two linking spring components 525, two stiff beams 527, and a linking spring component 533. A first pair of the anchors 519, a first pair of the flexible support elements 523, a first linking spring component 525, and a first stiff beam 527 are substantially identical and symmetrically oriented about the centerline 182 in mirror symmetry relative to, respectively, a second pair of the anchors 519, a second pair of flexible support elements 523, a second linking spring component 525, and a second stiff beam 527. More specifically, the first pair of the anchors 519 is fixed to the surface of the substrate 150 near a central region of the fourth side of the Coriolis mass 102 in mirror symmetry about the centerline 182 to the second pair of the anchors 519, which is fixed to the surface of the substrate 150 near a central region of the fourth side of the Coriolis mass 106. The first and second stiff beams 527 are positioned between the first and second pairs of anchors 519 in mirror symmetry about the centerline 182. Each stiff beam 527 has a lengthwise dimension arranged substantially parallel to the sense axis 192.

Each linking spring component 525 connects a Coriolis mass to a stiff beam 527. Namely, the first linking spring component 525 has a lengthwise dimension arranged substantially parallel to the drive axis 194, with first ends connected to a central region of the Coriolis mass 102 and a second end connected to a central region of the of the first stiff beam 527. In mirror symmetry about the centerline 182, the second linking spring component 525 has a lengthwise dimension arranged substantially parallel to the drive axis 194, with first ends connected to a central region of the Coriolis mass 106 and a second end connected to a central region of the of the second stiff beam 527.

For an embodiment, the linking spring component 533 is similar in structure but longer in length to the linking spring component 113. Particularly, the linking spring component 533 is suspended relative to the substrate 150 and has a lengthwise dimension arranged substantially parallel to the sense axis 192. Moreover, the linking spring component 533 has a central region of one side connected to the first stiff beam 527 and a central region of another side connected to the second stiff beam 527.

The flexible support elements 523 of the first pair are linearly aligned with each other on opposing sides of the first linking spring component 525. Each flexible support element 523 of the first pair has a lengthwise dimension arranged substantially parallel to the fourth side of the Coriolis mass 102 with a first end connected to one of the anchors 519 of the first pair of anchors and a second end connected near an end of the first stiff beam 527. In mirror symmetry about the centerline 182, the flexible support elements 523 of the second pair are linearly aligned with each other on opposing sides of the second linking spring component 525. Each flexible support element 523 of the second pair has a lengthwise dimension arranged substantially parallel to the fourth side of the Coriolis mass 106 with a first end connected to one of the anchors 519 of the second pair of anchors and a second end connected near an end of the second stiff beam 527.

Referring back to FIG. 1, a first sense mode shuttle 134 couples an end of the second leg of a first L-shaped stiff beam 122 and a first end of the first additional T-shaped stiff beam 130 to the third side of the first Coriolis mass 102. A second sense mode shuttle 136 couples an end of the second leg of a second L-shaped stiff beam 124 and a first end of the second additional T-shaped stiff beam 132 to the third side of the second Coriolis mass 104. A third sense mode shuttle 138 couples an end of the second leg of a third L-shaped stiff beam 126 and a second end of the first additional T-shaped stiff beam 130 to the third side of the third Coriolis mass 106. A fourth sense mode shuttle 140 couples an end of the second leg of a fourth L-shaped stiff beam 128 and a second end of the second additional T-shaped stiff beam 132 to the third side of the fourth Coriolis mass 108. A fifth sense mode shuttle 142 is coupled to the second side of the first Coriolis mass 102. A sixth sense mode shuttle 144 is coupled to the second side of the second Coriolis mass 104. A seventh sense mode shuttle 146 is coupled to the second side of the third Coriolis mass 106. An eighth sense mode shuttle 148 is coupled to the second side of the fourth Coriolis mass 108.

In the embodiment illustrated, a first linking spring component 129 connects a central point of a first side of the first sense mode shuttle 134 to the first end of the T-shaped stiff beam 130 and the end of the second leg of the L-shaped stiff beam 122. A second linking spring component 129 connects a central point of a first side of the second sense mode 136 shuttle to the first end of the T-shaped stiff beam 132 and the end of the second leg of the L-shaped stiff beam 124. A third linking spring component 129 connects a central point of a first side of the third sense mode shuttle 138 to the second end of the T-shaped stiff beam 130 and the end of the second leg of the L-shaped stiff beam 126. A fourth linking spring component 129 connects a central point of a first side of the fourth sense mode shuttle 140 to the second end of the T-shaped stiff beam 132 and the end of the second leg of the L-shaped stiff beam 128.

The sense mode shuttles 134, 136, 138, 140, 142, 144, 146, and 148 are each suspended relative to the substrate 150 and coupled to the Coriolis masses 102, 104, 106, and 108 using an elastic component and anchor system, the details of which are described by reference to FIG. 6. In the embodiment illustrated, sense mode shuttle 134 is suspended relative to the substrate 150 and coupled to the third side of the Coriolis mass 102 using the elastic component and anchor system of FIG. 6; and sense mode shuttle 142 is suspended relative to the substrate 150 and coupled to the second side of the Coriolis mass 102 using the elastic component and anchor system of FIG. 6. Sense mode shuttle 136 is suspended relative to the substrate 150 and coupled to the third side of the Coriolis mass 104 using the elastic component and anchor system of FIG. 6; and sense mode shuttle 144 is suspended relative to the substrate 150 and coupled to the second side of the Coriolis mass 104 using the elastic component and anchor system of FIG. 6. Sense mode shuttle 138 is suspended relative to the substrate 150 and coupled to the third side of the Coriolis mass 106 using the elastic component and anchor system of FIG. 6; and sense mode shuttle 146 is suspended relative to the substrate 150 and coupled to the second side of the Coriolis mass 106 using the elastic component and anchor system of FIG. 6. Sense mode shuttle 140 is suspended relative to the substrate 150 and coupled to the third side of the Coriolis mass 108 using the elastic component and anchor system of FIG. 6; and sense mode shuttle 148 is suspended relative to the substrate 150 and coupled to the second side of the Coriolis mass 108 using the elastic component and anchor system of FIG. 6.

Figure 6:
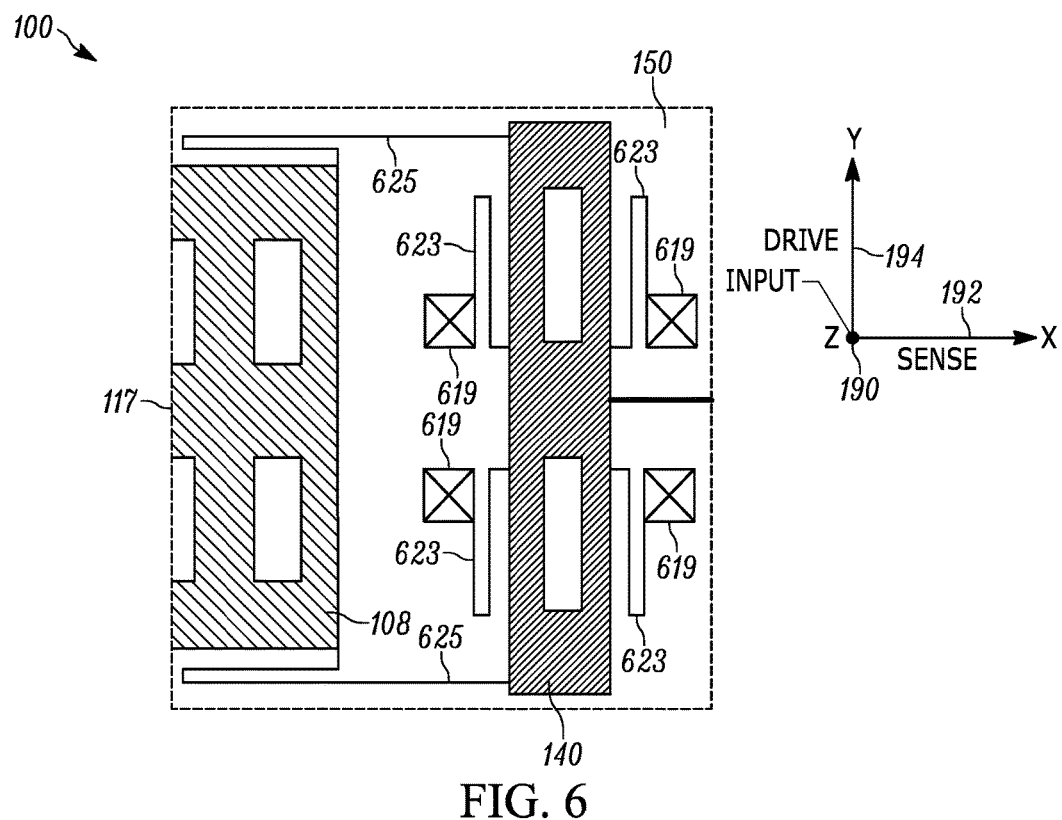
FIG. 6 shows a top view of an enlarged portion of the MEMS angular rate sensor of FIG. 1, illustrating an elastic component and anchor system used to couple a sense mode shuttle to the substrate and to a Coriolis mass.

Referring now to FIGS. 1 and 6, FIG. 6 shows an enlarged partial top view of the angular rate sensor 100, which is demarcated in FIG. 1 by a dashed line box 117, illustrating an elastic component and anchor system used to couple the sense mode shuttle 140 to the substrate 150 and to the Coriolis mass 108. Although the elastic component and anchor system is described in connection with sense mode shuttle 140 and Coriolis mass 108, it should be understood that the following discussion applies equivalently to sense mode shuttles 134 and 142 and Coriolis mass 102, sense mode shuttles 136 and 144 and Coriolis mass 104, sense mode shuttles 138 and 146 and Coriolis mass 106, and sense mode shuttle 148 and Coriolis mass 108.

As illustrated in FIG. 6, the elastic component and anchor system includes four anchors 619, four flexible support elements 623, and two linking spring components 625. The anchors 619 and flexible support elements 623 couple the sense mode shuttle 140 to the substrate 150 and suspend the sense mode shuttle 140 relative to the substrate 150. Namely, two of the anchors 619 are connected to the surface of substrate 150 near a central region of the first side of the sense mode shuttle 140. The other two anchors 619 are connected to the surface of the substrate 150 near a central region of a second side of the sense mode shuttle 140 and near a central region of the side of the Coriolis mass 108.

Each flexible support element 623 has a lengthwise dimension arranged adjacent to and substantially parallel to the first or the second side of the sense mode shuttle 140. Moreover, each flexible support element 623 connects the side of the sense mode shuttle 140, to which it is adjacent, to the closest anchor 619 on that side. The linking spring components 625 connect the second side of the sense mode shuttle 140 to the side of the Coriolis mass 108. Namely, each linking spring component 625 has a lengthwise dimension arranged adjacent to and substantially parallel to the first or fourth side of the Coriolis mass 108. A first end of the linking spring component 625 is connected to a closest corner of the Coriolis mass 108, and a second end is connected to a closest end of the second side of sense mode shuttle 140. The flexible support elements 623 restrict movement of the sense mode shuttle 140 to the sense axis 192, and the linking spring components 625 enable movement of the Coriolis mass 108 along the sense axis 192 substantially concurrently as the sense mode shuttle 140 moves.

Figure 7:
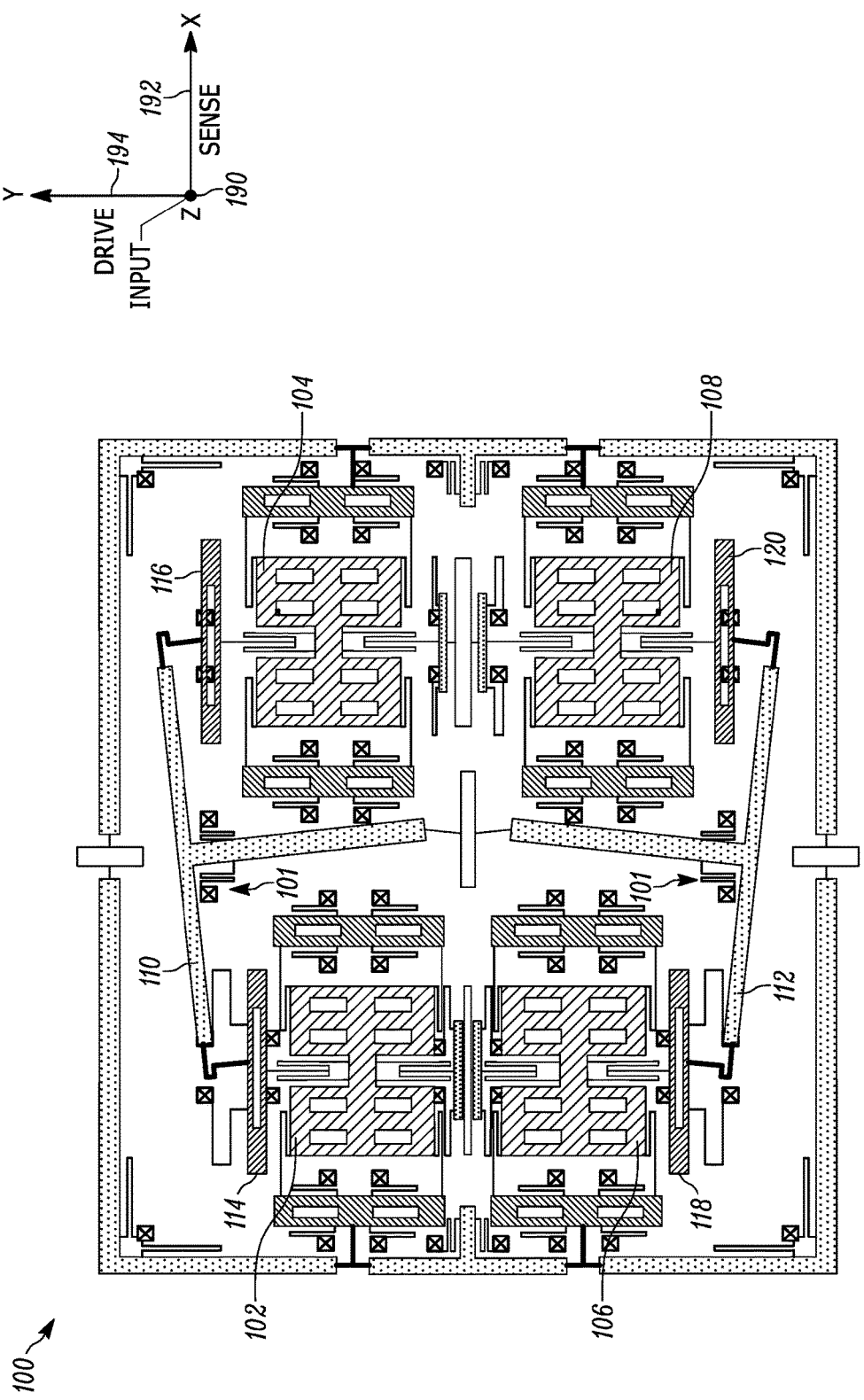
FIG. 7 depicts operation of the MEMS angular rate sensor of FIG. 1 in a drive mode while suppressing in-phase motion of the Coriolis masses.

FIG. 7 depicts operation of the MEMS angular rate sensor of FIG. 1 in a drive mode while suppressing in-phase motion of the Coriolis masses. During an illustrative drive mode of the angular rate sensor 100, a drive force is exerted upon the Coriolis masses 102, 104, 106, and 108 forcing them into an oscillatory anti-phase motion along the drive axis 194. During the drive mode, the Coriolis masses 102, 104, 106, and 108 oscillate between a first drive mode state and a second drive mode state. For example, the Coriolis masses 102, 104, 106, and 108 oscillate between the first and second drive mode states at an operating frequency of about 20.0 kilohertz (kHz). During the first drive mode state, as depicted in FIG. 7, the Coriolis masses 102 and 106 move together along the drive axis 194 while the Coriolis masses 104 and 108 move apart along the drive axis 194. During the second drive mode state, the Coriolis masses 102 and 106 move apart along the drive axis 194 while the Coriolis masses 104 and 108 move together along the drive axis 194.

For an embodiment, the drive mode force is an electrostatic force that is generated when a drive signal, e.g., an alternating current (AC) voltage, is applied to differential lateral comb fingers or parallel plate electrodes (not shown) on the drive mode shuttles 114, 116, 118, and 120. The drive mode shuttles 114, 116, 118, and 120 are, thereby, biased to cause the drive mode shuttles to undergo in-plane oscillatory linear motion in the drive direction. Since, the Coriolis masses 102, 104, 106, and 108 are coupled to drive mode shuttles 114, 116, 118, and 120, the Coriolis masses are forced by the drive mode shuttles into the in-plane oscillatory linear motion in the drive direction.

During the drive mode, the second set of levers, which includes the T-shaped stiff beams 110 and 112, is configured to constrain an in-phase motion of the Coriolis masses 102, 104, 106, 108 along the drive axis 194. Namely, while the angular rate sensor 100 is in the drive mode, any external force upon the angular rate sensor 100 that would cause the Coriolis masses 102, 104, 106, and 108 to move in-phase along the drive axis 194 is mechanically constrained by the rotational movement of the stiff beams 110 and 112 about the hinges 101 (FIG. 2) and the rigidity of the first and second legs of the stiff beams 110 and 112.

More particularly, the first legs of the first and second T-shaped stiff beams 110 and 112 are configured to constrain an in-phase motion of the Coriolis masses 102, 104, 106, and 108 along the drive axis 194 in response to linear acceleration and at least some parasitic acceleration. This can be done through tuning the spring constants or stiffness of the first legs of the T-shaped stiff beams 110 and 112 during the semiconductor manufacturing process. Additionally, the second legs of the first and second T-shaped stiff beams 110 and 112 are configured to constrain an in-phase motion of the Coriolis masses 102, 104, 106, and 108 along the drive axis 194 in response to angular acceleration. This can be done through tuning the spring constants or stiffness of the second legs of the T-shaped stiff beams 110 and 112 during the semiconductor manufacturing process.

Figure 8:
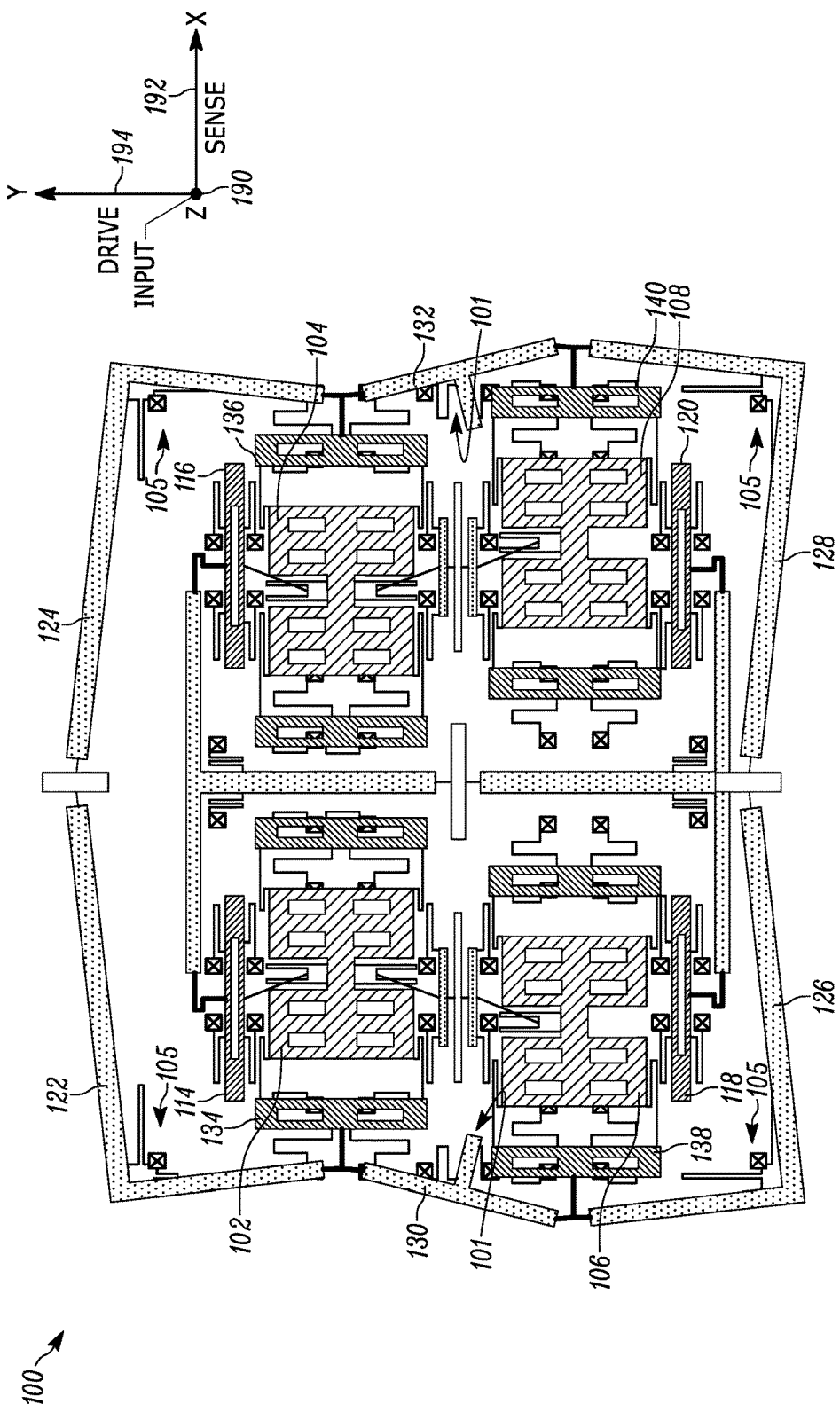
FIG. 8 depicts operation of the MEMS angular rate sensor of FIG. 1 in a sense mode while suppressing in-phase motion of the Coriolis masses.

FIG. 8 depicts operation of the MEMS angular rate sensor 100 in a sense mode while suppressing in-phase motion of the Coriolis masses. During an illustrative sense mode of the angular rate sensor 100, in response to an external clockwise rotational stimulus about the input axis 190, a sense mode force caused by the Coriolis effect is exerted upon the Coriolis masses 102, 104, 106, and 108. The sense mode force causes anti-phase oscillatory motion of the Coriolis masses 102, 104, 106, and 108 along the sense axis. Namely, during the sense mode, the Coriolis masses 102, 104, 106, and 108 oscillate between a first sense mode state and a second sense mode state. For example, the Coriolis masses oscillate between the first and second sense mode states at an operating frequency of about 24.9 kHz.

During the first sense mode state, as depicted in FIG. 8, the Coriolis masses 102 and 104 move together along the sense axis 192 while the Coriolis masses 106 and 108 move apart along the sense axis 192. During the second sense mode state, the Coriolis masses 102 and 104 move apart along the sense axis 192 while the Coriolis masses 106 and 108 move together along the sense axis 192. This anti-phase motion, which has an amplitude that is proportional to the angular rotation rate of the angular rate sensor 100 about the input axis 190, can be sensed or detected, for example, as a capacitance change between differential parallel plate electrodes or sense fingers on the sense mode shuttles 134, 136, 138, 140, 142, 144, 146, and 148.

During the sense mode, the first set of levers, which includes the L-shaped stiff beams 122, 124, 126, and 128 and the T-shaped stiff beams 130 and 132, is configured to constrain an in-phase motion of the Coriolis masses along the sense axis 192. Namely, while the angular rate sensor 100 is in the sense mode, any external force upon the angular rate sensor 100 that would cause the Coriolis masses 102, 104, 106, and 108 to move in-phase along the sense axis 192 is mechanically constrained by the rotational movement of the stiff beams 122, 124, 126, and 128 about the hinges 105, the rotational movement of the stiff beams 130 and 132 about the hinges 101, and the rigidity of the stiff beams 122, 124, 126, 128, 130 and 132.

More particularly, the first legs of the first and second additional T-shaped stiff beams 130 and 132 are configured to constrain an in-phase motion of the Coriolis masses 102, 104, 106, and 108 along the sense axis 192 in response to linear acceleration and at least some parasite acceleration. This can be done through tuning the spring constants or stiffness of the first legs of the T-shaped stiff beams 130 and 132 during the semiconductor manufacturing process. Additionally, the first, second, third, and fourth L-shaped stiff beams 122, 124, 126, and 128 are configured to constrain an in-phase motion of the Coriolis masses 102, 104, 106, and 108 along the sense axis 192 in response to linear and angular acceleration. This can be done through tuning the spring constants or stiffness of the first and second legs of the L-shaped stiff beams 122, 124, 126, and 128 during the semiconductor manufacturing process.

Figure 9:
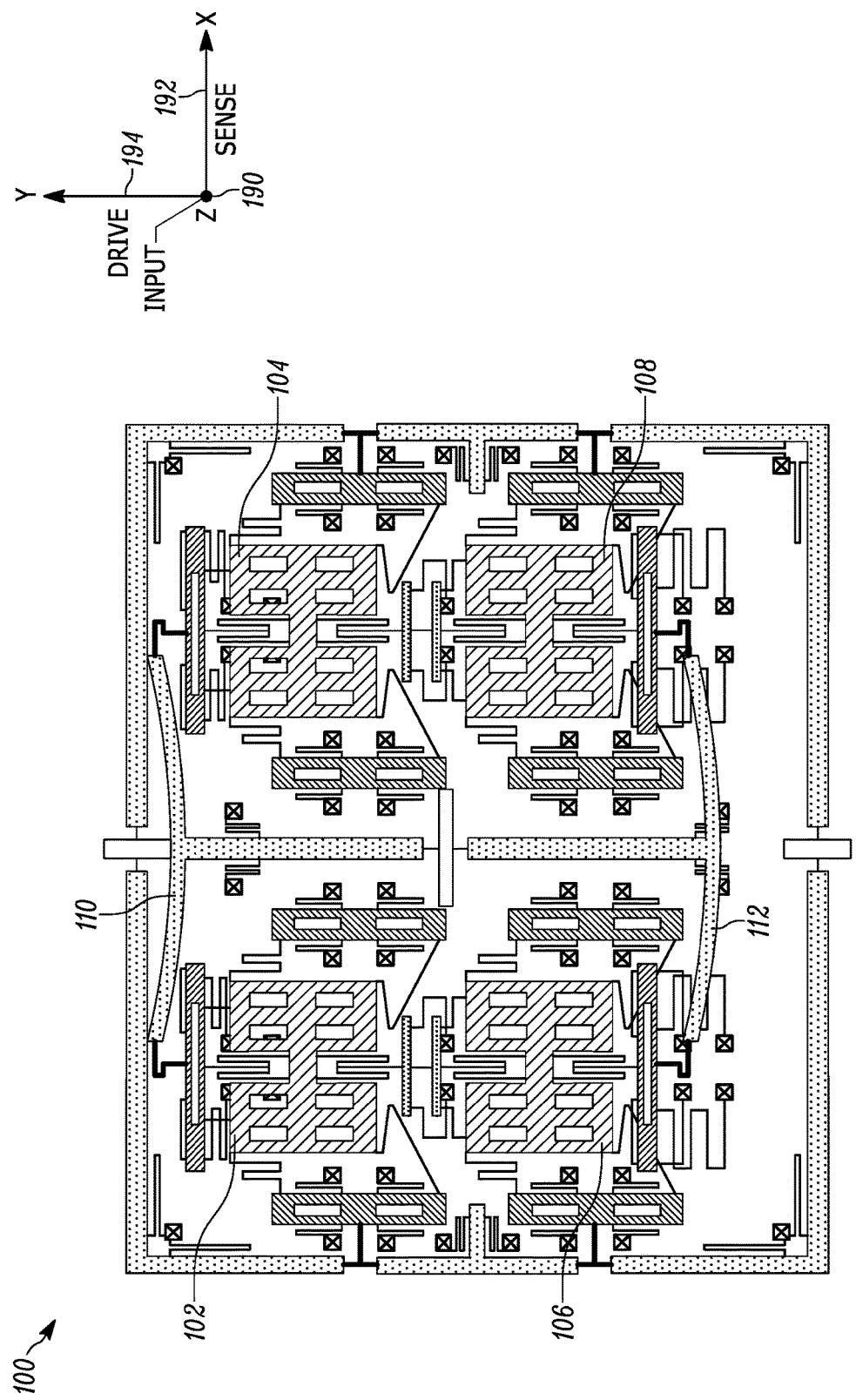
FIG. 9 illustrates common mode excitation of the MEMS angular rate sensor of FIG. 1 in response to linear acceleration while in the drive mode.

FIG. 9 illustrates common mode excitation of the Coriolis masses 102, 104, 106, and 108 along the drive axis 194 in response to linear acceleration while the angular rate sensor 100 is in the drive mode. For a particular implementation, the in-phase motion of the Coriolis masses 102, 104, 106, and 108 is constrained or suppressed when the angular rate sensor 100 is subject to external forces along the drive axis 194 below a frequency of about 45.8 kHz, which is more than twice the illustrative operating frequency of the angular rate sensor 100. Consequently, not until a common mode frequency of 45.8 kHz or higher will the first legs of the stiff beams 110 and 112 deform or bend in the same direction, thereby, allowing the in-phase motion of the Coriolis masses 102, 104, 106, and 108.

Figure 10:
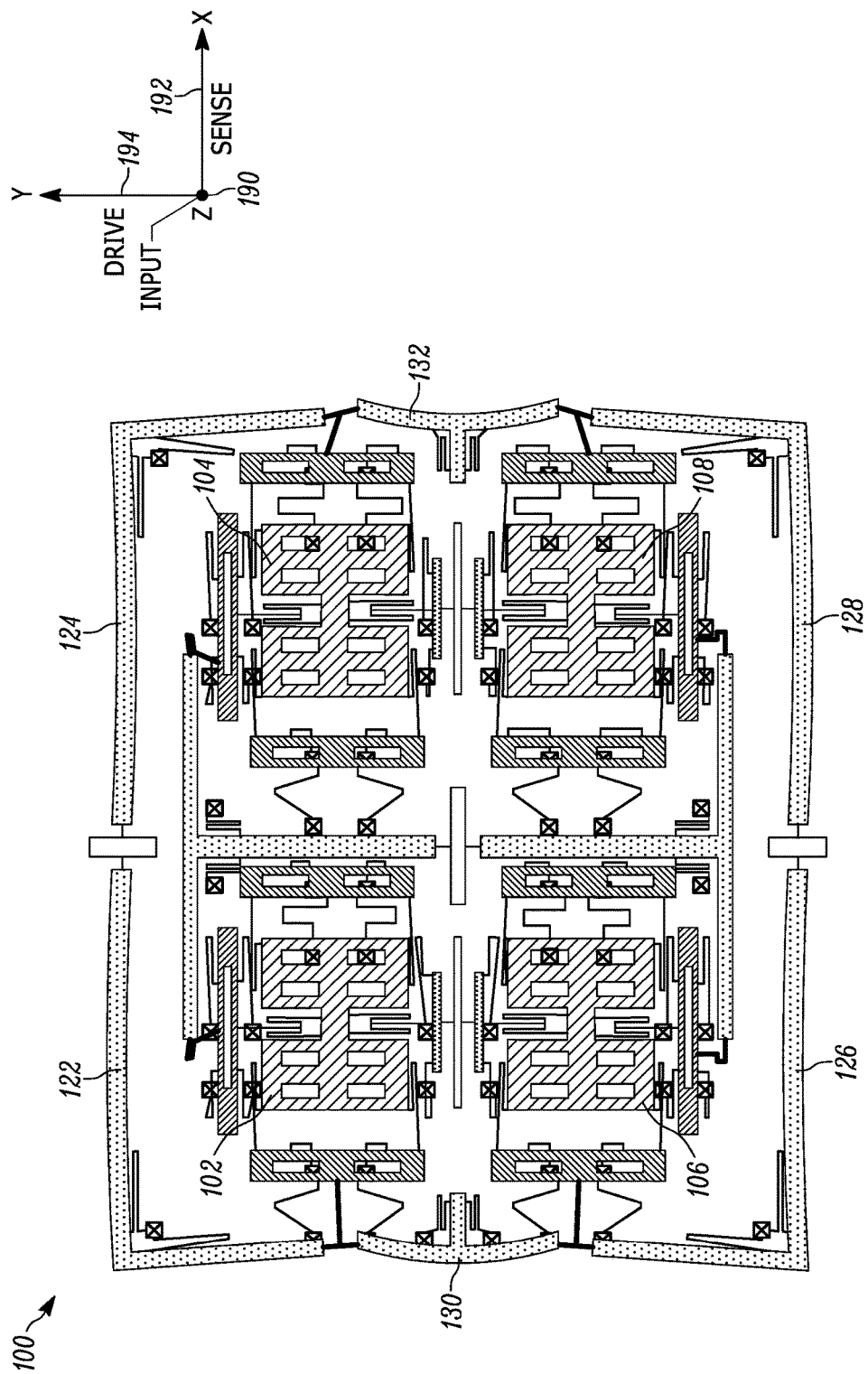
FIG. 10 illustrates common mode excitation of the MEMS angular rate sensor of FIG. 1 in response to linear acceleration while in the sense mode.

FIG. 10 illustrates common mode excitation of the MEMS angular rate sensor 100 in response to linear acceleration while in the sense mode. For example, FIG. 10 illustrates common mode excitation of the Coriolis masses 102, 104, 106, and 108 along the sense axis 192 in response to linear acceleration while the angular rate sensor 100 is in the sense mode. For a particular implementation, the in-phase motion of the Coriolis masses 102, 104, 106, and 108 is constrained or suppressed when the angular rate sensor 100 is subject to external forces along the sense axis 192 below a frequency of about 55.2 kHz, which is more than twice the illustrative operating frequency of the angular rate sensor 100. Consequently, not until a common mode frequency of 55.2 kHz or higher will the first legs of the stiff beams 130 and 132 and the first and second legs of the stiff beams 122, 124, 126, and 128 deform or bend for instance as illustrated, thereby, allowing the in-phase motion of the Coriolis masses 102, 104, 106, and 108.

Figure 11:
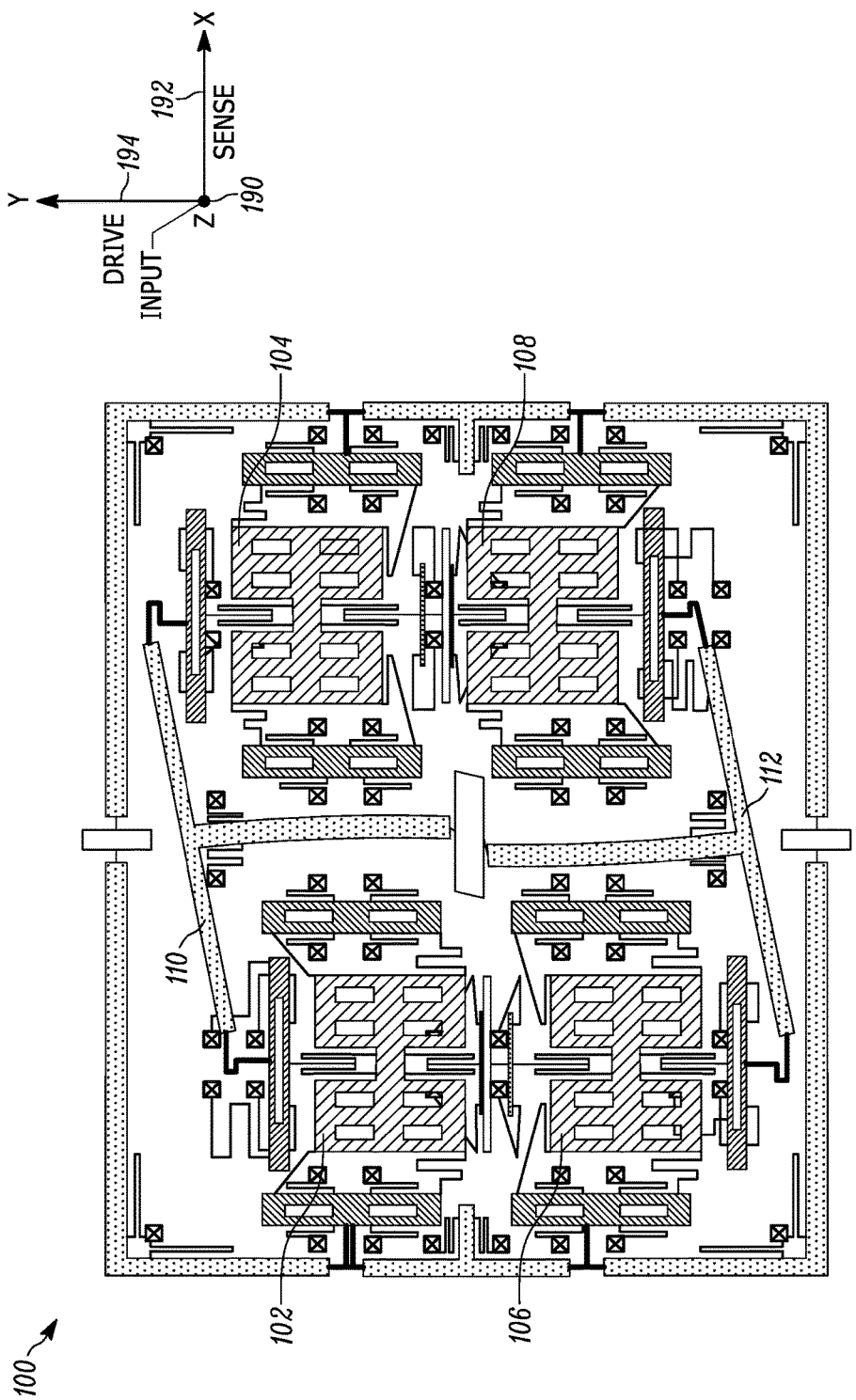
FIG. 11 illustrates common mode excitation of the MEMS angular rate sensor of FIG. 1 in response to angular acceleration while in the drive mode.

FIG. 11 illustrates common mode excitation of the MEMS angular rate sensor 100 in response to angular acceleration while in the drive mode. FIG. 11 illustrates common mode excitation of the Coriolis masses 102, 104, 106, and 108 along the drive axis 194 in response to angular acceleration while the angular rate sensor 100 is in the drive mode. For a particular implementation, the in-phase motion of the Coriolis masses 102, 104, 106, and 108 is constrained or suppressed when the angular rate sensor 100 is subject to counter-clockwise rotational external forces around the Z-axis 190 below a frequency of about 34.3 kHz, which is well more than the illustrative operating frequency of the angular rate sensor 100. Consequently, not until a common mode frequency of 34.3 kHz or higher will the second legs of the stiff beams 110 and 112 deform or bend in opposite directions, thereby, allowing the in-phase motion of the Coriolis masses 102, 104, 106, and 108.

Figure 12:
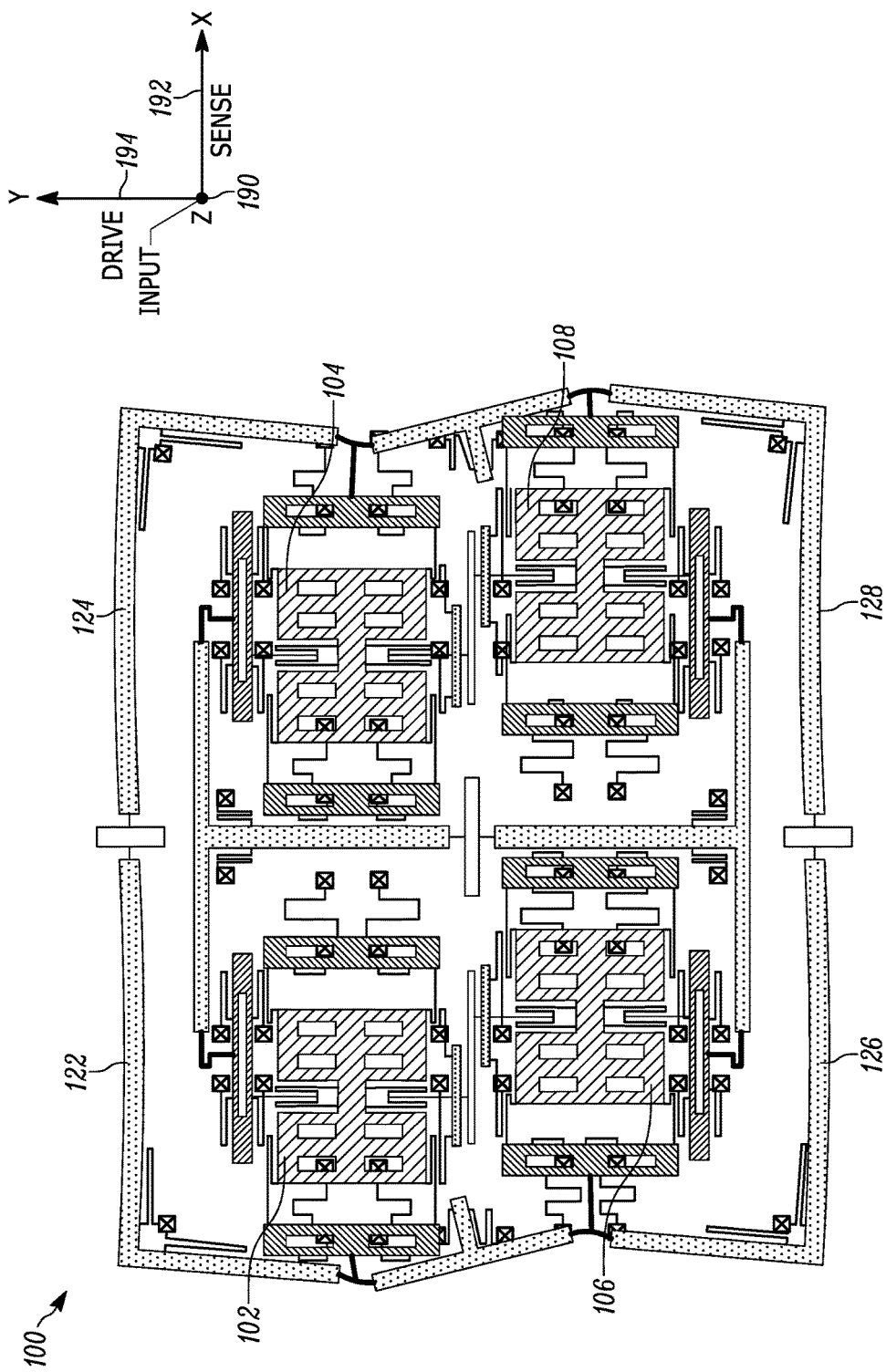
FIG. 12 illustrates common mode excitation of the MEMS angular rate sensor of FIG. 1 in response to angular acceleration while in the sense mode.

FIG. 12 illustrates common mode excitation of the MEMS angular rate sensor of FIG. 1 in response to angular acceleration while in the sense mode. FIG. 12 illustrates common mode excitation of the Coriolis masses 102, 104, 106, and 108 along the sense axis 192 in response to angular acceleration while the angular rate sensor 100 is in the sense mode. For a particular implementation, the in-phase motion of the Coriolis masses 102, 104, 106, and 108 is constrained or suppressed when the angular rate sensor 100 is subject to counter-clockwise rotational external forces around the Z-axis 190 below a frequency of about 38.4 kHz, which is well more than the illustrative operating frequency of the angular rate sensor 100. Consequently, not until a common mode frequency of 38.4 kHz or higher will the legs of the stiff beams 122, 124, 126, and 128 deform or bend, thereby, allowing the in-phase motion of the Coriolis masses 102, 104, 106, and 108.

Figure 13:
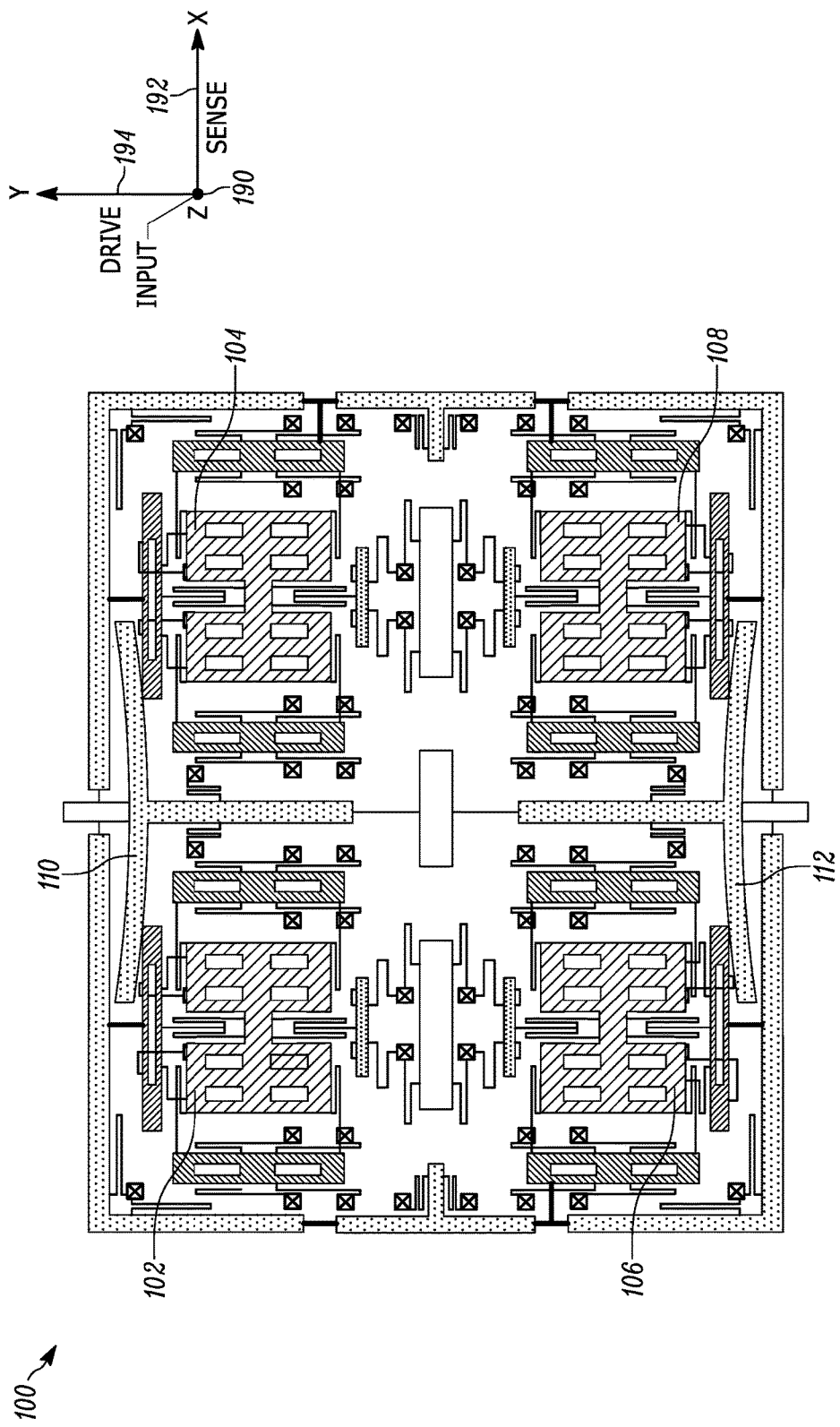
FIG. 13 illustrates common mode excitation of the MEMS angular rate sensor of FIG. 1 in response to parasitic acceleration while in the drive mode.

FIG. 13 illustrates common mode excitation of the Coriolis masses 102, 104, 106, and 108 along the drive axis 194 in response to parasitic acceleration while the angular rate sensor 100 is in the drive mode. For a particular implementation, the in-phase motion of the Coriolis masses 102, 104, 106, and 108 is constrained or suppressed when the angular rate sensor 100 is subject to external parasitic forces below a frequency of about 47.1 kHz, which is more than twice the illustrative operating frequency of the angular rate sensor 100. Consequently, not until a common mode frequency of 47.1 kHz or higher will the first legs of the stiff beams 110 and 112 deform or bend in opposite directions, thereby, allowing the in-phase motion of the Coriolis masses 102, 104, 106, and 108.

Figure 14:
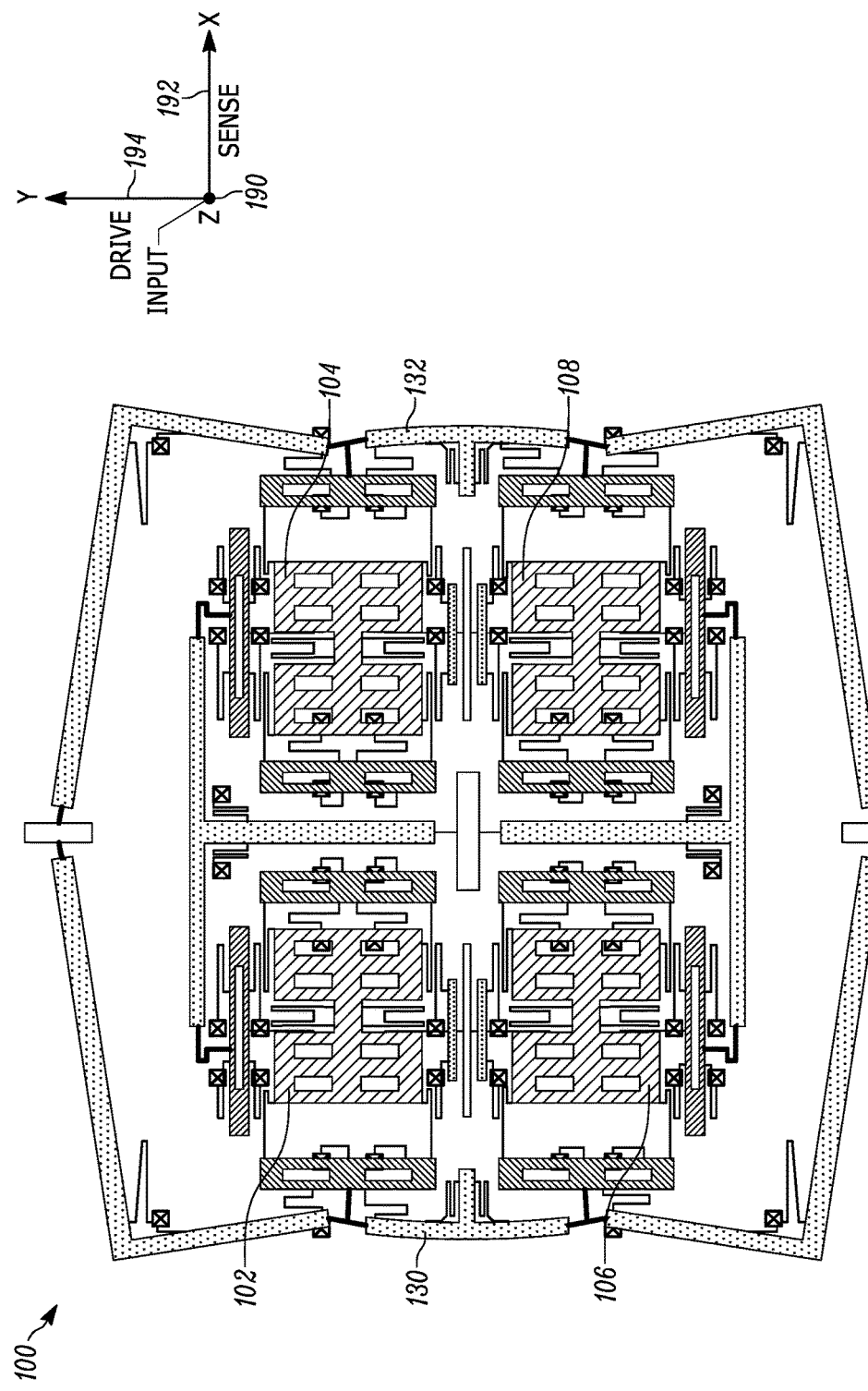
FIG. 14 illustrates common mode excitation of the MEMS angular rate sensor of FIG. 1 in response to parasitic acceleration while in the sense mode.

FIG. 14 illustrates common mode excitation of the Coriolis masses 102, 104, 106, and 108 along the sense axis 192 in response to parasitic acceleration while the angular rate sensor 100 is in the sense mode. For a particular implementation, the in-phase motion of the Coriolis masses 102, 104, 106, and 108 is constrained or suppressed when the angular rate sensor 100 is subject to external parasitic forces below a frequency of about 50.8 kHz, which is more than twice the illustrative operating frequency of the angular rate sensor 100. Consequently, not until a common mode frequency of 50.8 kHz or higher will the first legs of the stiff beams 130 and 132 deform or bend in the same direction, thereby, allowing the in-phase motion of the Coriolis masses 102, 104, 106, and 108.

The preceding detailed description is merely illustrative in nature and is not intended to limit the embodiments of the subject matter or the application and uses of such embodiments. Furthermore, there is no intention to be bound by any expressed or implied theory presented in the preceding technical field, background, or detailed description. For instance, although a MEMS angular rate sensor is described herein, it should be understood that the lever mechanism may be adapted for use in other devices implementing movable masses configured to move anti-phase and for which in-phase motion is suppressed.

At least some of the figures may be illustrated using various shading and/or hatching to distinguish the various elements from one another. Moreover, connecting lines shown in the various figures contained herein are intended to represent illustrative functional relationships and/or physical couplings between the various elements. It should be noted that many alternative or additional functional relationships or physical connections may be present in an embodiment of the subject matter. In addition, certain terminology may also be used herein for the purpose of reference only or to distinguish one element from another, and thus is not intended to be limiting. For example, the terms "first" and "second," "top" and "bottom," and other such relational terms referring to structures do not necessarily require a particular sequence, order, or relationship.

The instant disclosure is provided to further explain in an enabling fashion at least one preferred embodiment and the best modes, at the time of the application, of making and using various embodiments in accordance with the present disclosure. The disclosure is further offered to enhance an understanding and appreciation for the inventive principles and advantages thereof, rather than to limit in any manner the invention. The invention is defined solely by the appended claims including any amendment made during the pendency of this application and all equivalents of those claims as issued.

The foregoing description refers to elements or features being "connected" or "coupled" together. As used herein, unless expressly stated otherwise, "connected" means that one element is directly joined to (or directly communicates with) another element, and not necessarily mechanically. Likewise, unless expressly stated otherwise, "coupled" means that one element is, depending on the context, either directly or indirectly joined to (or directly or indirectly communicates with, electrically or otherwise) another element, and not necessarily mechanically. Thus, although the schematics shown in the figures depict some example arrangements of elements, additional intervening elements, devices, features, or components may be present in additional embodiments of the subject matter.

While at least one illustrative embodiment has been presented in the foregoing detailed description, it should be appreciated that a vast number of variations exist. It should also be appreciated that the illustrative embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. An angular rate sensor comprising:
   first, second, third, and fourth Coriolis masses configured such that the Coriolis masses are movable along perpendicular drive and sense axes;
   a lever mechanism comprising first and second sets of levers, wherein the first set of levers is coupled together outside a boundary of the Coriolis masses, and the second set of levers is coupled together within a boundary of the first set of levers and between the Coriolis masses, wherein the second set of levers is configured to produce an anti-phase drive mode motion of the Coriolis masses along the drive axis, the first set of levers is configured to allow an anti-phase sense mode motion of the Coriolis masses along the sense axis responsive to the angular rate sensor rotating around an input axis that is perpendicular to the drive and sense axes, the first and second sets of levers are configured to constrain an in-phase motion of the Coriolis masses, and the second set of levers is configured to constrain an in-phase motion of the Coriolis masses along the drive axis, wherein:
   the second set of levers comprises diametrically positioned first and second T-shaped stiff beams each having a first leg, a perpendicularly intersecting second leg, and two hinges, wherein ends of the second legs are coupled together, and the T-shaped stiff beams are configured to rotate about the two hinges at intersections of the first and second legs of the T-shaped stiff beams, wherein:
   the first leg of the first T-shaped stiff beam is coupled lengthwise to first sides of the first and second Coriolis masses, which are parallel to the sense axis;

the first leg of the second T-shaped stiff beam is coupled lengthwise to first sides of the third and fourth Coriolis masses, which are parallel to the sense axis;

the second leg of the first T-shaped second stiff beam extends between second sides of the first and second Coriolis masses, which are parallel to the drive axis; and the second leg of the second T-shaped second stiff beam extends between second sides of the third and fourth Coriolis masses, which are parallel to the drive axis; and first, second, third, and fourth drive mode shuttles each having a lengthwise dimension arranged parallel to the sense axis and each coupled to allow movement of the drive mode shuttles along the drive axis and constrain movement of the drive mode shuttles along the sense axis, wherein:

the first and second drive mode shuttles respectively couple opposing ends of the first leg of the first T-shaped stiff beam to the first sides of the first and second Coriolis masses, and the second leg of the first T-shaped second stiff beam extends between the first and second drive mode shuttles; and the third and fourth drive mode shuttles respectively couple opposing ends of the first leg of the second T-shaped stiff beam to the first sides of the third and fourth Coriolis masses, and the second leg of the second T-shaped second stiff beam extends between the third and fourth drive mode shuttles.

2. The angular rate sensor of claim 1, wherein the second legs of the first and second T-shaped stiff beams are configured to constrain an in-phase motion of the Coriolis masses along the drive axis in response to angular acceleration.

3. The angular rate sensor of claim 1, wherein the first set of levers is configured to constrain an in-phase motion of the Coriolis masses along the sense axis.

4. An angular rate sensor comprising:

first, second, third, and fourth Coriolis masses configured such that the Coriolis masses are movable along perpendicular drive and sense axes; and a lever mechanism comprising first and second sets of levers, wherein the first set of levers is coupled together outside a boundary of the Coriolis masses, and the second set of levers is coupled together within a boundary of the first set of levers and between the Coriolis masses, wherein the second set of levers is configured to produce an anti-phase drive mode motion of the Coriolis masses along the drive axis, the first set of levers is configured to allow an anti-phase sense mode motion of the Coriolis masses along the sense axis responsive to the angular rate sensor rotating around an input axis that is perpendicular to the drive and sense axes, and the first and second sets of levers are configured to constrain an in-phase motion of the Coriolis masses, wherein the first set of levers comprises:

first, second, third, and fourth L-shaped stiff beams arranged around the boundary of the Coriolis masses, wherein first legs of the L-shaped stiff beams are positioned parallel to the sense axis, second perpendicularly intersecting legs of the L-shaped stiff beams are positioned parallel to the drive axis, and ends of the first legs of different pairs of the L-shaped stiff beams are coupled together;

first and second additional T-shaped stiff beams having first and second perpendicularly intersecting legs, wherein the first leg of each additional T-shaped stiff beam is coupled lengthwise between the second legs of different pairs of the L-shaped stiff beams; and six hinges, wherein the L-shaped stiff beams are configured to rotate about four of the hinges at intersections of the first and second legs of the L-shaped stiff beams, and the first and second additional T-shaped stiff beams are configured to rotate about the remaining two hinges at intersections of the first and second legs of the additional T-shaped stiff beams; and first, second, third, fourth, fifth, sixth, seventh, and eighth sense mode shuttles each having a lengthwise dimension arranged parallel to the drive axis and each coupled to allow movement of the sense mode shuttles along the sense axis and constrain movement of the sense mode shuttles along the drive axis, wherein:

the first sense mode shuttle couples an end of the second leg of the first L-shaped stiff beam and a first end of the first additional stiff beam to a third side of the first Coriolis mass;

the second sense mode shuttle couples an end of the second leg of the second L-shaped stiff beam and a first end of the second additional stiff beam to a third side of the second Coriolis mass;

the third sense mode shuttle couples an end of the second leg of the third L-shaped stiff beam and a second end of the first additional stiff beam to a third side of the third Coriolis mass;

the fourth sense mode shuttle couples an end of the second leg of the fourth L-shaped stiff beam and a second end of the second additional stiff beam to a third side of the fourth Coriolis mass;

the fifth sense mode shuttle is coupled to the second side of the first Coriolis mass;

the sixth sense mode shuttle is coupled to the second side of the second Coriolis mass;

the seventh sense mode shuttle is coupled to the second side of the third Coriolis mass; and the eighth sense mode shuttle is coupled to the second side of the fourth Coriolis mass.

5. The angular rate sensor of claim 4, wherein the first, second, third, and fourth L-shaped stiff beams are configured to constrain an in-phase motion of the Coriolis masses along the sense axis in response to angular acceleration.

6. The angular rate sensor of claim 4 further comprising:

a first elastic component coupling ends of the first legs of the first and second L-shaped stiff beams together;

a second elastic component coupling ends of the second legs of the first and second T-shaped stiff beams together; and a third elastic component coupling ends of the first legs of the third and fourth L-shaped stiff beams together.

7. A microelectromechanical systems device comprising:

a planar substrate;

first, second, third, and fourth Coriolis masses configured such that the Coriolis masses are movable along perpendicular drive and sense axes which form a plane that is parallel to the planar substrate, wherein the Coriolis masses are suspended relative to the planar substrate; and a lever mechanism comprising first and second sets of levers, wherein the first set of levers is coupled together outside a boundary of the Coriolis masses, and the second set of levers is coupled together within a boundary of the first set of levers and between the Coriolis masses, wherein the second set of levers is configured to produce an anti-phase drive mode motion of the Coriolis masses along the drive axis, the first set of levers is configured to allow an anti-phase sense mode motion of the Coriolis masses along the sense axis responsive to the microelectromechanical systems device rotating around an input axis that is perpendicular to the drive and sense axes, and the first and second sets of levers are configured to constrain an in-phase motion of the Coriolis masses;

wherein the second set of levers comprises:
diametrically positioned first and second T-shaped stiff beams each having a first leg and a perpendicularly intersecting second leg, wherein ends of the second legs are coupled together;
a first set of two hinges, wherein the T-shaped stiff beams are configured to rotate about the two hinges at intersections of the first and second legs of the T-shaped stiff beams, wherein the first legs of the first and second T-shaped stiff beams are configured to constrain an in-phase motion of the Coriolis masses along the drive axis in response to linear acceleration, and the second legs of the first and second T-shaped stiff beams are configured to constrain an in-phase motion of the Coriolis masses along the drive axis in response to angular acceleration;

wherein:
the first leg of the first T-shaped stiff beam is coupled lengthwise to first sides of the first and second Coriolis masses, which are parallel to the sense axis;
the first leg of the second T-shaped stiff beam is coupled lengthwise to first sides of the third and fourth Coriolis masses, which are parallel to the sense axis;
the second leg of the first T-shaped second stiff beam extends between second sides of the first and second Coriolis masses, which are parallel to the drive axis;
the second leg of the second T-shaped second stiff beam extends between second sides of the third and fourth Coriolis masses, which are parallel to the drive axis wherein the first set of levers comprises:
first, second, third, and fourth L-shaped stiff beams arranged around the boundary of the Coriolis masses, wherein first legs of the L-shaped stiff beams are positioned parallel to the sense axis, second perpendicularly intersecting legs of the L-shaped stiff beams are positioned parallel to the drive axis, and ends of the first legs of different pairs of the L-shaped stiff beams are coupled together;
first and second additional T-shaped stiff beams having first and second perpendicularly intersecting legs, wherein the first leg of each additional T-shaped stiff beam is coupled lengthwise between the second legs of different pairs of the L-shaped stiff beams;
a second set of six hinges, wherein the L-shaped stiff beams are configured to rotate about four hinges of the second set of hinges at intersections of the first and second legs of the L-shaped stiff beams, and the first and second additional T-shaped stiff beams are configured to rotate about the remaining two hinges of the second set of hinges at intersections of the first and second legs of the additional T-shaped stiff beams, wherein the first, second, third, and fourth L-shaped stiff beams are configured to constrain an in-phase motion of the Coriolis masses along the sense axis in response to angular acceleration, and the first and second T-shaped stiff beams are configured to constrain an in-phase motion of the Coriolis masses along the sense axis is response to linear acceleration;

the microelectromechanical systems device further comprising first, second, third, and fourth drive mode shuttles each having a lengthwise dimension arranged parallel to the sense axis and each coupled to allow movement of the drive mode shuttles along the drive axis and constrain movement of the drive mode shuttles along the sense axis, wherein:
the first and second drive mode shuttles respectively couple opposing ends of the first leg of the first T-shaped stiff beam to the first sides of the first and second Coriolis masses, and the second leg of the first T-shaped second stiff beam extends between the first and second drive mode shuttles;
the third and fourth drive mode shuttles respectively couple opposing ends of the first leg of the second T-shaped stiff beam to the first sides of the third and fourth Coriolis masses, and the second leg of the second T-shaped second stiff beam extends between the third and fourth drive mode shuttles;

the microelectromechanical systems device further comprising first, second, third, and fourth sense mode shuttles each having a lengthwise dimension arranged parallel to the drive axis and each coupled to allow movement of the sense mode shuttles along the sense axis and constrain movement of the sense mode shuttles along the drive axis, wherein:
the first sense mode shuttle couples an end of the second leg of the first L-shaped stiff beam and a first end of the first additional stiff beam to a third side of the first Coriolis mass;
the second sense mode shuttle couples an end of the second leg of the second L-shaped stiff beam and a first end of the second additional stiff beam to a third side of the second Coriolis mass;
the third sense mode shuttle couples an end of the second leg of the third L-shaped stiff beam and a second end of the first additional stiff beam to a third side of the third Coriolis mass.

* * * * *